(12) United States Patent
Sun et al.

(10) Patent No.: US 9,161,106 B2
(45) Date of Patent: Oct. 13, 2015

(54) METHOD AND DEVICE FOR IMPLEMENTING SHARED MESH PROTECTION AND OPTICAL NETWORK SYSTEM

(75) Inventors: Jun Sun, Shenzhen (CN); Junzhou Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 656 days.

(21) Appl. No.: 13/524,822

(22) Filed: Jun. 15, 2012

(65) Prior Publication Data

US 2012/0257886 A1 Oct. 11, 2012

Related U.S. Application Data

(63) Continuation of application No. PCT/CN2010/079505, filed on Dec. 7, 2010.

(30) Foreign Application Priority Data

Dec. 18, 2009 (CN) .......................... 2009 1 0261627

(51) Int. Cl.
*G02F 1/00* (2006.01)
*H04Q 11/00* (2006.01)
(Continued)

(52) U.S. Cl.
CPC ............ *H04Q 11/0062* (2013.01); *H04L 69/40* (2013.01); *H04L 45/22* (2013.01); *H04L 45/28* (2013.01); *H04Q 2011/0081* (2013.01); *H04Q 2011/0098* (2013.01)

(58) Field of Classification Search
CPC .. H04B 10/032; H04B 10/038; H04B 10/035; H04L 41/0659; H04L 41/0654; H04L 41/0668
USPC ............. 398/1, 2, 3, 4, 5, 7, 8, 10, 12, 13, 17, 398/25, 33, 38, 30, 31, 32, 45, 48, 49, 56, 398/58, 79, 50; 370/216, 217, 218, 225, 370/228, 224
See application file for complete search history.

(56) References Cited

U.S. PATENT DOCUMENTS 7,450,497 B2 * 11/2008 Trudel et al. .................. 370/224
7,787,362 B2   8/2010 Xu
(Continued)

FOREIGN PATENT DOCUMENTS

CN       1747368 A    3/2006
CN    101453411 A    6/2009
(Continued)

OTHER PUBLICATIONS

Partial Translation of Chinese Office Action of Chinese Application No. 200910261627.1 mailed Aug. 3, 2012.
(Continued)

*Primary Examiner* — Hanh Phan

(57) ABSTRACT

Embodiments of the present invention disclose a method for implementing shared mesh protection includes: receiving, by a first node, a message of a second type sent by a second node, where the message of the second type carries a second positive incoming sublabel allocated by the second node for a protection path of a first service and the second positive incoming sublabel is used to indicate a specified feature of recovery information of the first service; allocating, by the first node, a first positive outgoing label for the protection path of the first service based on the second positive incoming sublabel, where the first positive outgoing label corresponds to the second positive incoming sublabel; and transmitting the recovery information of the first service to the second node based on an indication of the first positive outgoing sublabel when knowing that a working path of the first service is faulty.

10 Claims, 6 Drawing Sheets

(51) Int. Cl.
    *H04L 29/14*     (2006.01)
    *H04L 12/707*     (2013.01)
    *H04L 12/703*     (2013.01)

(56) References Cited

U.S. PATENT DOCUMENTS

| | | |
|---|---|---|
| 7,965,938 B2 | 6/2011 | Xu |
| 2004/0193724 A1 | 9/2004 | Dziong et al. |
| 2005/0088963 A1 | 4/2005 | Phelps et al. |
| 2006/0067210 A1 | 3/2006 | Liu et al. |
| 2006/0159009 A1 | 7/2006 | Kim et al. |
| 2010/0208583 A1* | 8/2010 | Liou et al. ............ 370/225 |

FOREIGN PATENT DOCUMENTS

| | | |
|---|---|---|
| CN | 101588520 A | 11/2009 |
| KR | 20030001635 A | 1/2003 |

OTHER PUBLICATIONS

International Search Report dated Mar. 10, 2011 in connection with International Patent Application No. PCT/CN2010/079505.

Supplementary European Search Report dated Sep. 4, 2012 in connection with European Patent Application No. EP 10 83 7018.

Raul Munoz, et al., "An Experimental Signalling Enhancement to Efficiently Encompass WCC and Backup Sharing in GMPLS-enabled Wavelength-Routed Networks", IEEE, May 19, 2008, p. 5401-5406.

Raul Munoz, et al., "Experimental GMPLS-Based Provisioning for Future All-Optical DPRing-Based MAN", Journal of Lightwave Technology, vol. 23, No. 10, Oct. 2005, p. 3034-3045.

Written Opinion of the International Searching Authority dated Mar. 10, 2011 in connection with International Patent Application No. PCT/CN2010/079505.

* cited by examiner

METHOD AND DEVICE FOR IMPLEMENTING SHARED MESH PROTECTION AND OPTICAL NETWORK SYSTEM

CROSS-REFERENCE TO RELATED APPLICATIONS

This application is a continuation of International Application No. PCT/CN2010/079505, filed on Dec. 7, 2010, which claims priority to Chinese Patent Application No. 200910261627.1, filed on Dec. 18, 2009, both of which are hereby incorporated by reference in their entireties.

TECHNICAL FIELD

The present invention relates to the field of communications technologies, and in particular, to a method and device for implementing shared mesh protection and an optical network system.

BACKGROUND

An optical network has a high service transmission rate and therefore is widely applied. A customer service may be transmitted by establishing one or more optical network connections that satisfy a bandwidth requirement of the customer service. Reliability of service transmission is a key performance indicator (KPI) that measures whether the optical network is stable.

The reliability of the service transmission on the optical network may be implemented by using various protection and recovery technologies. For example, a rerouting technology of a control plane may be used to recover an optical network connection. The control plane is a control network that runs in the optical network. The optical network provides a control channel that uses a Generalized Multi-Protocol Label Switching (GMPLS, Generalized Multi-Protocol Label Switching) protocol suite. The GMPLS protocol suite includes a routing protocol and a signaling protocol. The routing protocol is mainly responsible for collecting topology information (including node and link information) of the optical network and calculating a path that a connection passes through. The signaling protocol is mainly responsible for establishing the optical network connection based on the calculated path.

In a case where the control plane is used, a rerouting function may be provided for the connection. That is, when the connection (work connection) that transmits the customer service is faulty, the control plane uses a pre-configured recovery path (or recalculating a path) to establish a new connection (a recovery connection) for transmitting the customer service. This manner does not need to always provide two connections for the customer service. Another available connection needs to be provided only under a case where the connection is faulty. Therefore, bandwidth utilization is high. Fault recovery duration, however, is generally long because a recovery technology of the control plane is used. A connection established by using a GMPLS control plane technology is generally called a label switch path (LSP, Label Switch Path). Establishment of the LSP is triggered by an initial node, and a rerouting process is also triggered by the initial node.

To further improve resource utilization, it is proposed that a shared mesh protection technology is used to provide a transmission service for the customer service. A service transmitted using the shared mesh protection technology is called a shared mesh protection service. Each shared mesh protection service includes a working path and a recovery path. The working paths of two shared mesh protection services are separated and the recovery paths may share channel resources. An automatic protection switching (APS, Automatic Protection Switching) overhead of a channel is used to transmit a shared mesh protection message. A same channel may be shared by multiple services. Therefore, different service messages need to be distinguished in the APS overhead of the channel.

The prior art mainly implements shared mesh protection through manual configuration on a network management system. This manner, however, strongly relies on devices, such as a network management system and a configuration operation is extremely complex. Therefore, a network operation risk is high.

SUMMARY

Embodiments of the present invention provide a method and device for implementing shared mesh protection and an optical network system, which enables each node on a protection path to accurately and simply determine a service to be recovered. In addition, a configuration operation is simple. In this way, reliable support may be provided for subsequently performing service protection switchover.

To resolve the preceding technical issues, the embodiments of the present invention provides the following technical solutions:

An embodiment of the present invention provides a method for implementing shared mesh protection, including:

receiving, by a first node, a message of a second type sent by a second node, where the message of the second type carries a second positive incoming sublabel allocated by the second node to a protection path of a first service and the second positive incoming sublabel is used to indicate a specified feature of recovery information of the first service;

allocating a first positive outgoing sublabel for the protection path of the first service based on the second positive incoming sublabel, where the first positive outgoing sublabel corresponds to the second positive incoming sublabel; and transmitting the recovery information of the first service to the second node based on an indication of the first positive outgoing sublabel when a working path of the first service is faulty.

An embodiment of the present invention further provides a method for implementing shared mesh protection, including:

allocating, by a second node, a second positive incoming sublabel for a protection path of a first service, where the second positive incoming sublabel is used to indicate a specified feature of recovery information of the first service; and sending the second positive incoming sublabel to a first node on the protection path of the first service through a message of a second type.

An embodiment of the present invention further provides an optical network node, including:

a receiving module, configured to receive a message of a second type sent by a second node, where the message of the second type carries a second positive incoming sublabel allocated by the second node to a protection path of a first service and the second positive incoming sublabel is used to indicate a specified feature of recovery information of the first service;

an allocation module, configured to allocate a first positive outgoing sublabel for the protection path of the first service based on the second positive incoming sublabel, where the first positive outgoing sublabel corresponds to the second positive incoming sublabel; and a recovery information sending module, configured to transmit the recovery information of the first service to the second node based on an indication of the first positive outgoing sublabel when a working path of the first service is faulty.

An embodiment of the present invention further provides an optical network node, including:

a first allocation module, configured to allocate a second positive incoming sublabel for a protection path of a first service, where the second positive incoming sublabel is used to indicate a specified feature of recovery information of the first service; and a message sending module, configured to send the second positive incoming sublabel to a first node on the protection path of the first service through a message of a second type.

An embodiment of the present invention further provides an optical network system, where the optical network system includes:

a second node, configured to allocate a second positive incoming sublabel for a protection path of a first service, where the second positive incoming sublabel is used to indicate a specified feature of recovery information of the first service; and send the second positive incoming sublabel to a first node on the protection path of the first service through a message of a second type; and a first node, configured to receive the message of the second type sent by the second node, where the message of the second type carries the second positive incoming sublabel allocated by the second node for the protection path of the first service; allocate a first positive outgoing sublabel for the protection path of the first service based on the second positive incoming sublabel, where the first positive outgoing sublabel corresponds to the second positive incoming sublabel; and transmit the recovery information of the first service to the second node based on an indication of the first positive outgoing sublabel when a working path of the first service is faulty.

As can be seen from above, in the embodiments of the present invention, a node on a protection path allocates and transmits a sublabel that is used to indicate a specified feature of recover information of a service so that an upstream node or a downstream node of this node transmits the recovery information of the service according to the sublabel. In this way, each node on the protection path may be capable of directly determining a service to be recovered when receiving the recovery information of the service. In addition, a configuration operation is simple. In this way, reliable support may be provided for subsequently performing automatic and quick protection switchover of the service.

BRIEF DESCRIPTION OF THE DRAWINGS

To make the technical solutions in the embodiments of the present invention or in the prior art clearer, the following briefly describes the accompanying drawings required in the description about the embodiments or the prior art. Apparently, the accompanying drawings described below are merely some embodiments of the present invention. A person skilled in the art may further obtain other accompanying drawings based on these accompanying drawings without creative efforts.

FIG. 1-*b* is a schematic structural diagram of an optical network topology according to an embodiment of the present invention;

FIG. 4-*b* is a schematic diagram of APS overhead division according to Embodiment 3 of the present invention;

FIG. 4-*c* is a schematic diagram of APS overhead allocation according to Embodiment 3 of the present invention;

FIG. 4-*d* is a schematic diagram of distinction device allocation according to Embodiment 3 of the present invention;

DETAILED DESCRIPTION

Embodiments of the present invention provide a method and device for implementing shared mesh protection and an optical network system, which enables each node on a protection path to accurately and simply determine a service to be recovered. In addition, a configuration operation is simple. In this way, reliable support may be provided for subsequently performing automatic and quick protection switchover of the service.

The following clearly and completely describes technical solutions in the embodiments of the present invention with reference to the accompanying drawings in the embodiment of the present invention. Evidently, the described embodiments are merely a part of the embodiments of the present invention rather than all embodiments. All other embodiments, which can be deduced by a person skilled in the art from the embodiments given herein without any creative effort, shall fall within the protection scope of the present invention.

In the embodiments of the present invention, a signaling protocol of a control panel may use, for example, a Resource reSerVation Protocol-Traffic Engineering (RSVP-TE, Resource reSerVation Protocol-Traffic Engineering) of the GMPLS. Messages and objects mentioned in the embodiments of the present invention may all be messages and objects in the GMPLS RSVP-TE.

Figure 1A:
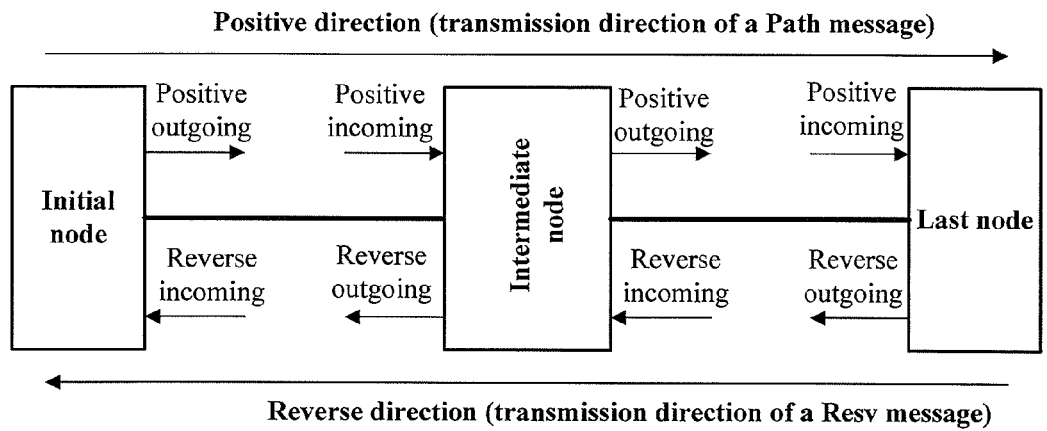
FIG. 1-*a* is a schematic diagram of an indication about a message transmission direction according to an embodiment of the present invention.
Figure 1B:
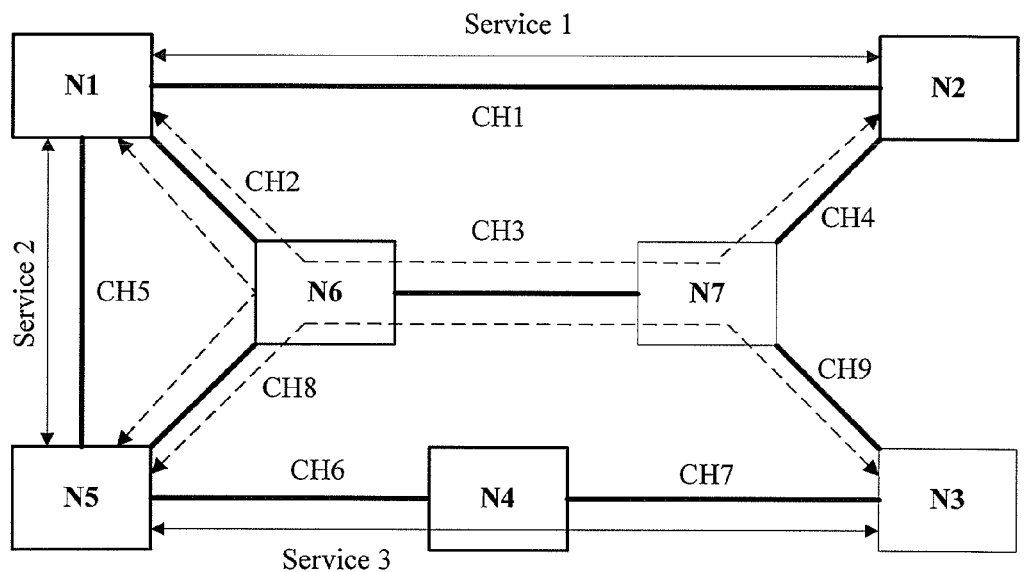

Referring to FIG. 1-*a* first, to facilitate understanding and description, a direction for transmitting service data from an initial node to the last node may be called a Downstream direction and may also be called a positive direction, that is, a direction for transmitting a Path message. A direction for transmitting the service data from the last node to the initial node is called an Upstream direction and may also be called a reverse direction, that is, a direction for transmitting a Resv message. The Path message is a message type defined in RSVP-TE and may be sent from a source node (the initial node) to a destination node (the last node) along a calculated route to instruct other nodes on the path to establish a connection. The Resv message is also a message type defined in RSVP-TE and may be sent from the destination node to the source node. The Resv message and the Path message may be cooperated to establish a bidirectional connection. Definitely, only a bidirectional service has the reverse direction while a unidirectional service does not have the reverse direction. The Resv message is transmitted and processed regardless of whether a service is unidirectional or bidirectional.

For each node, a direction for receiving the Path message is a positive incoming direction, a direction for sending the Path message is a positive outgoing direction, a direction for receiving the Resv message is a reverse incoming direction, and a direction for sending the Resv message is a reverse outgoing direction. Anode between the initial node and the last node may be called an intermediate node. There may be provided 0, 1, or multiple intermediate nodes. A node that sends the Path message may be called an upstream node and a node that receives the Path message is a downstream node. It may be understood that the upstream node and the downstream node are relative. Definitely, the initial node may be called the upstream node of each other node and the last node may be called the downstream node of each other node.

For example, in an optical network shown in FIG. 1-b, three shared mesh protection services exist. A solid line indicates a working path of each of the services and a dotted line indicates a protection path of each of the services. The working paths of the three services are separated. Therefore, the protection paths of the services may share resources. For example, the protection paths of service 1 and service 2 share channel 2 (CH2) resources, the protection paths of service 1 and service 3 share channel 3 (CH3) resources, and the protection paths of service 2 and service 3 share channel 8 (CH8) resources.

As shown in FIG. 1-b, in the working path of service 1, if node N1 is the initial node, node N2 is the last node. In the protection path of service 1, if node N1 is the initial node, nodes N6 and N7 are intermediate nodes and node N2 is the last node. When the working path of service 1 is faulty, the initial node N1 may use an APS overhead of channel 2 (CH2) to send recovery information to node N6 to start automatic protection switchover, so that service 1 is switched over to the protection path for transmission. The rest may be deduced by analogy.

In this embodiment of the present invention, a node on a protection path allocates and delivers a sublabel that is used to indicate a specified feature of recovery information of a service and an upstream node or a downstream node that acquires the sublabel transmits the recovery information of the service according to the sublabel. In this manner, each node on the protection path is capable of directly determining a service to be recovered when receiving the recovery information of the service.

Figure 2:
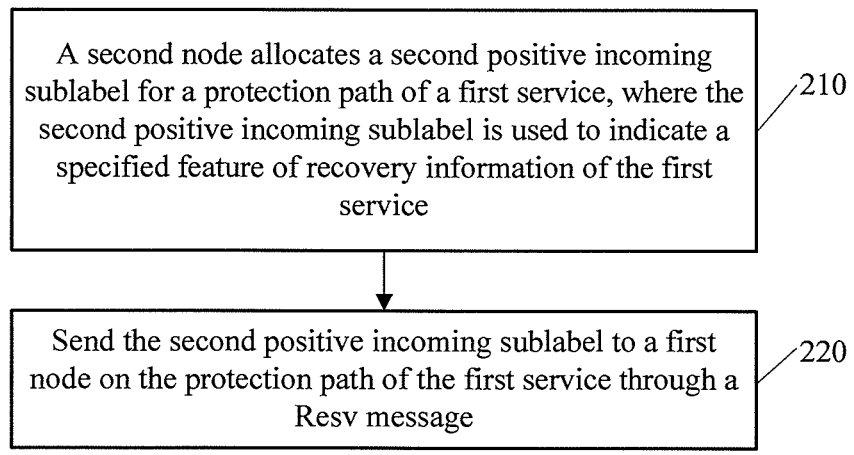
FIG. 2 is a flow chart of a method for implementing shared mesh protection according to Embodiment 1 of the present invention.

The following introduces a processing process of a node (for example, a second node) that allocates and delivers a sublabel on a protection path. Referring to FIG. 2, a method for implementing shared mesh protection according to Embodiment 1 of the present invention includes:

210: The second node allocates a second positive incoming sublabel for a protection path of a first service, where the second positive incoming sublabel is used to indicate a specified feature of recovery information of the first service.

The specified feature of the recovery information of the first service may include for example: a specified identifier (for example, a service distinction device) included in the recovery information of the first service, a specified data structure of the recovery information of the first service, an identifier of a sub-APS overhead (for example, the number of the sub-overhead) that bears the recovery information of the first service, or other related features.

In an application scenario, the second positive incoming sublabel allocated by the second node for the protection path of the first service may be any information that is capable of indicating the specified feature of the recovery information of the first service. For example, the sublabel may indicate one or more of the following specified features of the recovery information of the first service: the specified identifier included in the recovery information of the first service, the specified data structure of the recovery information of the first service, or the number of the sub-APS overhead that bears the recovery information of the first service, and other specified features.

220: Send the second positive incoming sublabel to a first node on the protection path of the first service through a message of a second type.

The message of the second type mentioned in each embodiment of the present invention may be, for example, a Resv message or another message with a similar function. The message of the second type may carry indication information for creating the protection path of the first service. The indication information for creating the protection path of the first service carried in the message of the second type may be arbitrary. For example, the indication information may be carried through an indication bit in the message of the second type, or the sublabel carried in this message directly serves as the indication information for creating the protection path of the first service, and definitely, another manner may also be selected.

It may be understood that the second node may be the last node of the protection path of the first service or an intermediate node of the protection path of the first service, and the first node is an upstream node of the second node.

In an application scenario, the second node may carry the allocated second positive incoming sublabel in the message of the second type and send the second positive incoming sublabel to the upstream node on the protection path of the first service by using this signaling message. In this way, the first node of the second positive incoming sublabel is obtained and a first positive outgoing sublabel is correspondingly allocated (where, a value of the second positive incoming sublabel and that of the first positive outgoing sublabel may be identical or have a corresponding derived relationship; definitely, the first positive outgoing sublabel correspondingly allocated by the first node is also used to indicate the specified feature of the recovery information of the first service; in addition, the specified feature of the recovery information of the first service indicated by the first positive outgoing sublabel and that indicated by the second positive incoming sublabel are the same).

Further, when knowing that a working path of the first service is faulty, the first node may transmit the recovery information of the first service to the second node based on an indication of the first positive outgoing sublabel. When receiving the recovery information of the first service transmitted by the first node, the second node may directly determine that a service to be recovered is the first service based on the second positive incoming sublabel allocated by the second node. In this way, the first service may be quickly and automatically switched over onto the protection path of the first service for transmission.

For example, the second positive incoming sublabel allocated by the second node indicates that the recovery information of the first service carries service distinction device 1, and the second node may carry the second positive incoming sublabel in the message of the second type and send the second positive incoming sublabel to the first node; the first node may correspondingly allocate the first positive outgoing sublabel (for example, the value of the second positive incoming sublabel and that of the first positive outgoing sublabel is identical) based on the obtained second positive incoming sublabel, and when knowing that the working path of the first service is faulty, the first node may transmit the recovery information carrying service distinction device 1 to the second node based on the indication of the first positive outgoing sublabel; the second node may directly determine that the service to be recovered is the first service based on service distinction device information carried in the recovery information when receiving the recovery information that is transmitted by the first node and carries service distinction device 1.

The processing process of each shared protection service may be deduced by analogy based on the preceding manner. It may be understood that by using this mechanism, when receiving the recovery information, the second node may simply determine the service to be recovered. In this way, reliable support is provided for subsequently performing automatic and quick protection switchover of the service.

As can be seen from above, in this embodiment of the present invention, a node on a protection path allocates and transmits a sublabel that is used to indicate a specified feature of recover information of a service so that an upstream node or a downstream node of this node transmits the recovery information of the service according to the sublabel. In this way, each node on the protection path may be capable of directly determining a service to be recovered when receiving the recovery information of the service. In addition, a configuration operation is simple. In this way, reliable support is provided for subsequently performing the automatic and quick protection switchover of the service.

Further, before allocating the second positive incoming sublabel for the protection path of the first service, the second node may also receive a message of a first type sent by the first node. The message of the first type mentioned in each embodiment of the present invention may be, for example, a Path message or another message with a similar function. The message of the first type received by the second node may carry the first reverse incoming sublabel allocated by the first node for the protection path of the first service. The first reverse incoming sublabel is used to indicate the specified feature (for example, indicating the sub-APS overhead of the recovery information of the first service or the service distinction device carried in the recovery information of the first service) of the recovery information of the first service. The message of the first type may also carry the indication information for creating the protection path of the first service.

In an application scenario, the second node may also allocate the second reverse outgoing sublabel for the protection path of the first service based on the first reverse incoming sublabel, where the second reverse outgoing sublabel corresponds to the first reverse incoming sublabel; and when knowing that the working path of the first service is faulty, transmits the recovery information of the first service to the first node based on an indication of the second reverse outgoing sublabel.

In an application scenario, the second node may also calculate a reverse outgoing interface and a reverse outgoing channel of the protection path of the first service on the second node; establish a reverse binding relationship of the protection path of the first service on the second node, where the reverse binding relationship may include a mapping binding relationship between the reverse outgoing interface and reverse outgoing channel of the protection path of the first service on the second node and the second reverse outgoing sublabel; and when knowing that the working path of the first service is faulty, switch the first service over onto the protection path of the first service based on the established reverse binding relationship.

In an application scenario, the second node may also calculate a positive incoming interface of the protection path of the first service on the second node based on routing information, and allocate a positive incoming channel for the protection path of the first service; establish a positive binding relationship of the protection path of the first service on the second node, where the positive binding relationship may include a mapping binding relationship between the positive incoming interface and positive incoming channel of the protection path of the first service on the second node and the second positive incoming sublabel; and when knowing that the working path of the first service is faulty, switch the first service over onto the protection path of the first service based on the established positive binding relationship.

In an application scenario, if the message of the first type further carries indication information about a sublabel that the first node suggests allocating, the second node may allocate the second positive incoming sublabel for the protection path of the first service based on the suggestion of the first node or based on a local allocation situation.

In an application scenario, if the message of the first type further carries indication information about a range of a sublabel that the first node designates allocating, the second node may allocate the second positive incoming sublabel for the protection path of the first service within the range of the sublabel that the first node designates allocating.

In an application scenario, if the message of the first type further carries indication information about a sublabel that the initial node designates allocating, the second node may allocate the second positive incoming sublabel for the protection path of the first service based on an indication of the indication information about the sublabel that the initial node designates allocating.

In an application scenario, each upstream node of the second node may add, to the message of the first type, the reverse incoming sublabel allocated by each upstream node for the protection path of the first service. The second node may collect and record the reverse incoming sublabel that is allocated by each upstream node for the protection path of the first service and carried in the received message of the first type to facilitate subsequent maintenance and management.

Figure 3:
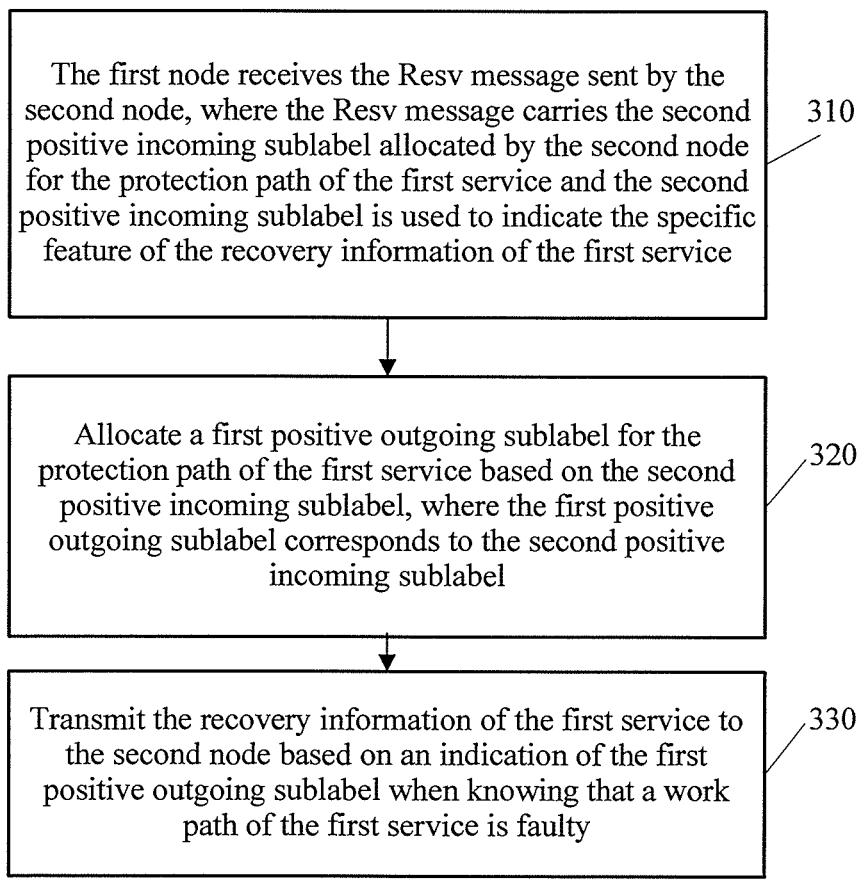
FIG. 3 is a flow chart of a method for implementing shared mesh protection according to Embodiment 2 of the present invention.
Figure 4A:
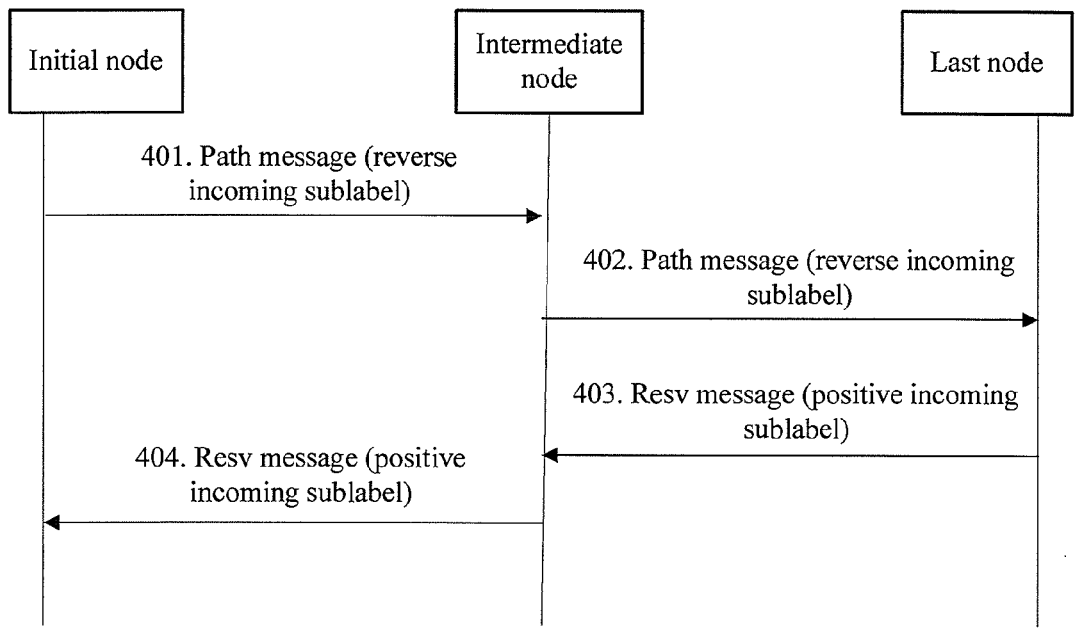
FIG. 4-*a* is a flow chart of a method for implementing shared mesh protection according to Embodiment 3 of the present invention.
Figure 4B:
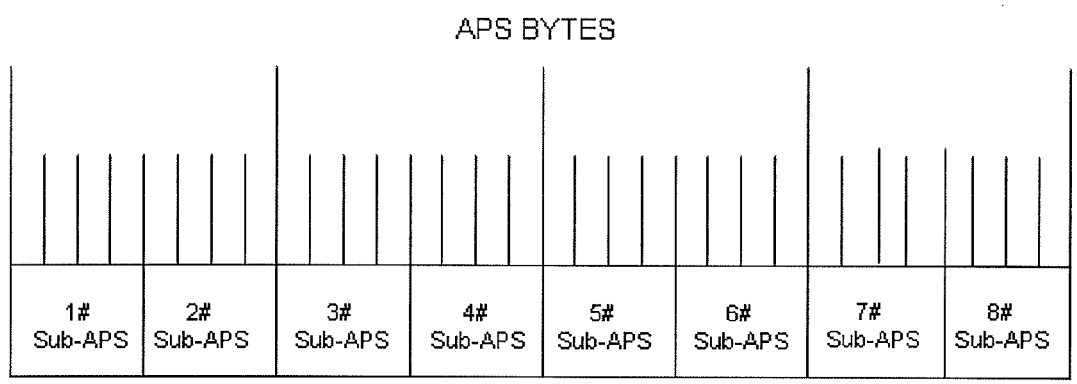
Figure 4C:
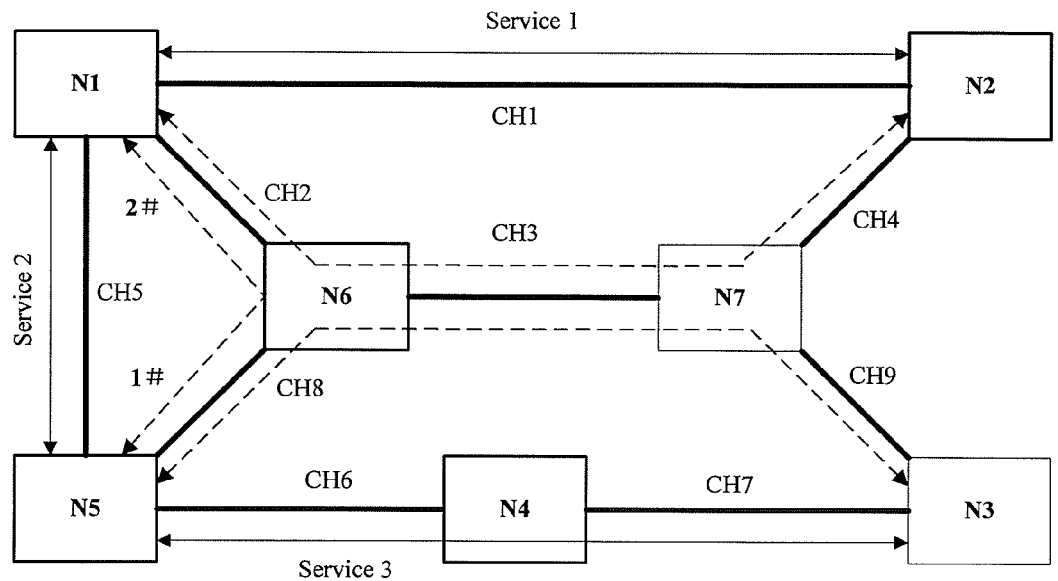
Figure 4D:
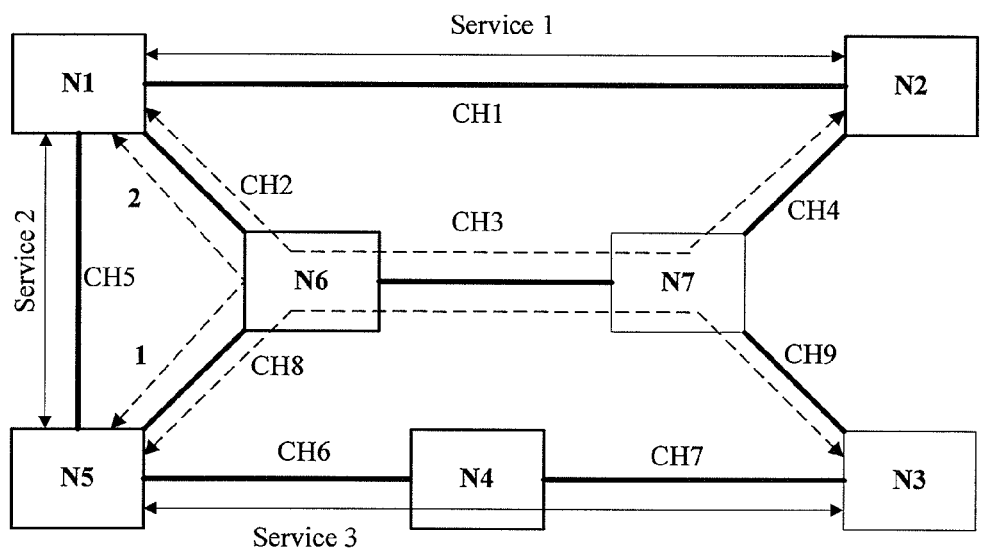

Further, the following introduces a processing process of a node (for example, a first node) that obtains a sublabel on a protection path. Referring to FIG. 3, a method for implementing shared mesh protection according to Embodiment 2 of the present invention includes:

310: The first node receives a message of a second type sent by a second node, where the message of the second type carries a second positive incoming sublabel allocated by the second node for a protection path of a first service and the second positive incoming sublabel is used to indicate a specified feature of recovery information of the first service.

The specified feature of the recovery information of the first service may include for example: a specified identifier (for example, a service distinction device) included in the recovery information of the first service, a specified data structure of the recovery information of the first service, an identifier of a sub-APS overhead (for example, the number of the sub-overhead) that bears the recovery information of the first service, or other related features.

It may be understood that the first node may be an initial node of the protection path of the first service or an intermediate node of the protection path of the first service, and the second node is an upstream node of the first node.

The message of the second type may further carry indication information for creating the protection path of the first service. The indication information for creating the protection path of the first service may be arbitrary. The indication information may be, for example, indication information carried in a specified indication bit in a Resv message, or directly be the sublabel carried in this signaling message, and definitely, may also be other indication information that can be identified by the first node.

320: Allocate a first positive outgoing sublabel for the protection path of the first service based on the second positive incoming sublabel, where the first positive outgoing sublabel corresponds to the second positive incoming sublabel.

A value of the second positive incoming sublabel and that of the first positive outgoing sublabel may be identical or have a corresponding deduced relationship; definitely, the first positive outgoing sublabel correspondingly allocated by the first node is also used to indicate the specified feature of the recovery information of the first service.

330: Transmit the recovery information of the first service to the second node based on an indication of the first positive outgoing sublabel when it is known that a working path of the first service is faulty.

Further, when knowing that the working path of the first service is faulty, the first node may transmit the recovery information of the first service to the second node based on the indication of the first positive outgoing sublabel. When receiving the recovery information of the first service transmitted by the first node, the second node may directly determine that a service to be recovered is the first service based on the second positive incoming sublabel allocated by the second node. In this way, the first service may be quickly and automatically switched over onto the protection path of the first service for transmission.

For example, the second positive incoming sublabel allocated by the second node indicates number 1 of a sub-APS overhead that bears the recovery information of the first service, and the second node may carry the second positive incoming sublabel in the message of the second type and send the second positive incoming sublabel to the first node; the first node may correspondingly allocate a first positive outgoing sublabel based on the obtained second positive incoming sublabel (for example, the value of the second positive incoming sublabel and that of the first positive outgoing sublabel are identical). When knowing that the working path of the first service is faulty, the first node may transmit the recovery information to the second node by using sub-APS overhead 1 based on the indication of the first positive outgoing sublabel. When receiving, through sub-APS overhead 1, the recovery information transmitted by the first node, the second node may directly determine that the service to be recovered is the first service based on the number of the sub-APS overhead that bears the recovery information.

The processing process of each shared protection service may be deduced by analogy based on the preceding manner. It may be understood that both the first node and the second node may transmit the recovery information of the service based on the preceding manner. When receiving the recovery information, the second node may simply determine the service to be recovered, which provides reliable support for subsequently performing automatic and quick protection switchover of the service.

As can be seen from above, in this embodiment of the present invention, a node on a protection path allocates and transmits a sublabel that is used to indicate a specified feature of recover information of a service so that an upstream node or a downstream node of this node transmits the recovery information of the service according to the sublabel. In this way, each node on the protection path may be capable of directly determine a service to be recovered when receiving the recovery information of the service. In addition, a configuration operation is simple. In this way, reliable support is provided for subsequently performing the automatic and quick protection switchover of the service.

Further, the first node may calculate a positive outgoing interface of the protection path of the first service on the first node based on routing information, and allocate a positive outgoing channel for the protection path of the first service; establish a positive binding relationship of the protection path of the first service on the first node, where the positive binding relationship may include a mapping binding relationship between the positive outgoing interface and positive outgoing channel of the protection path of the first service on the first node and the first positive outgoing sublabel; and when knowing that the working path of the first service is faulty, switch the first service over onto the protection path of the first service based on the positive binding relationship.

In an application scenario, for a bidirectional service, the first node may also calculate a reverse incoming interface of the protection path of the first service on the first node based on the routing information, and allocate a reverse incoming channel for the protection path of the first service; allocate a first reverse incoming sublabel for the protection path of the first service, where the first reverse incoming sublabel is used to indicate the specified feature (for example, may indicate the sub-APS overhead that bears the recovery information of the first service or the service distinction device carried in the recovery information of the first service) of the recovery information of the first service; and may send the first reverse incoming sublabel to the second node on the protection path of the first service through the message of the first type, where the message of the first type also carries the indication information for creating the protection path of the first service.

In an application scenario, if the first node is an intermediate node, the first node may calculate a positive incoming interface of the protection path of the first service on the first node based on the routing information, and allocate a positive incoming channel for the protection path of the first service; allocate a first positive incoming sublabel for the protection path of the first service, where the first positive incoming sublabel is used to indicate the specified feature of the recovery information of the first service and the positive binding relationship may also include a mapping binding relationship between the positive incoming interface and positive incoming channel of the protection path of the first service on the first node and the first positive incoming sublabel; and send the first positive incoming sublabel to a third node on the protection path of the first service through the message of the second type.

In an application scenario, the first node may also carry, in the message of the first type, indication information about a sublabel that the first node suggests allocating. The second node may allocate the second positive incoming sublabel for the protection path of the first service based on the suggestion of the first node or based on a local allocation situation.

In an application scenario, the first node may also carry, in the message of the first type, indication information about a range of a sublabel that the first node designates allocating. The second node may allocate the second positive incoming sublabel for the protection path of the first service within the range of the sublabel that the first node designates allocating.

In an application scenario, the first node may also carry, in the message of the first type, indication information about a sublabel that the initial node designates allocating. The second node may allocate the second positive incoming sublabel for the protection path of the first service based on an indication of the indication information about the sublabel that the initial node designates allocating.

In an application scenario, each upstream node of the second node may add, to the message of the first type, the reverse incoming sublabel allocated by each upstream node for the protection path of the first service. The second node may collect and record the reverse incoming sublabel that is allocated by each upstream node for the protection path of the first service and carried in the received message of the first type to facilitate subsequent maintenance and management.

In an application scenario, each downstream node of the first node may add, to the message of the second type, the positive incoming sublabel allocated by each downstream node for the protection path of the first service. The first node may collect and record the positive incoming sublabel that is allocated by each downstream node for the protection path of the first service and carried in the received message of the second type to facilitate subsequent maintenance and management.

Embodiment 3

This embodiment describes technical solutions of the present invention more specifically through a specific application scenario. In an application scenario, if an APS overhead is divided into multiple independent physical overhead channels, that is, multiple sub-APS (Sub-APS) overheads, which are respectively allocated to different services protected by a shared mesh for use. A sublabel may indicate an identifier of a sub-APS overhead used by a service (for example, the number of the sub-APS overhead). When a working path of a service is faulty, the service may be switched over by changing information (that is, recovery information) in the sub-APS overhead used by the service. If the APS overhead is not divided, the entire APS overhead is shared and used by all services protected by the shared mesh. In this case, the sublabel may indicate identification information (such as a service distinction device) of a shared mesh protection service. When the working path of a service is faulty, the recovery information including the identification information of the service is transmitted in the APS overhead to switch over the service. A process of establishing a protection path of service S1 (the shared mesh protection service) is taken as an example below for description.

In this embodiment, that a message of a first type is a Path message and a message of a second type is a Resv message is taken as an example for detailed description.

Referring to FIG. 4-a, a method for implementing shared mesh protection according to Embodiment 3 of the present invention may include:

401: An initial node calculates a reverse incoming interface of a protection path of service S1 on the initial node based on routing information and allocates a reverse incoming channel; and allocates a sublabel in a reverse incoming direction (a reverse incoming sublabel for short) on the initial node for the protection path of service S1.

The initial node establishes a reverse binding relationship of service S1 on the initial node, including: a binding relationship between the reverse incoming interface and the reverse incoming channel and the reverse incoming sublabel. A reverse outgoing interface, a reverse outgoing channel, and a reverse outgoing sublabel may not exist.

The initial node sends the allocated reverse incoming sublabel to a downstream node through the Path message.

The initial node may also carry, in the Path message, indication information for creating a shared mesh protection path to indicate that a currently established LSP is the shared mesh protection path.

Further, each upstream node may carry, in the Path message sent to the downstream node, the indication information for creating the shared mesh protection path to indicate for each downstream node that the currently established LSP is the shared mesh protection path. After receiving the Path message, each downstream node specifies that the currently established LSP is the shared mesh protection path based on the indication information for creating the shared mesh protection path carried in the Path message, and thereby initiates a corresponding process, which is not described here.

402: An intermediate node (if existing) receives the Path message sent by an upstream node, calculates a reverse outgoing interface and a reverse incoming interface of the protection path of service S1 on the intermediate node based on the routing information, and allocates a reverse outgoing channel and a reverse incoming channel for service S1.

The intermediate node may allocate a sublabel in a reverse outgoing direction (a reverse outgoing sublabel for short) on the intermediate node for the protection path of service S1 based on the sublabel carried in the received Path message. A value of the allocated reverse outgoing sublabel and that of the sublabel (the reverse incoming sublabel of the upstream node) carried in the received Path message may be the same. The intermediate node further allocates a sublabel in the reverse incoming direction (the reverse incoming sublabel for short) on the intermediate node for service S1 based on a local allocation situation.

The intermediate node may establish a reverse binding relationship of service S1 on the intermediate node, which may include: a binding relationship between the reverse incoming interface and the reverse incoming channel and the reverse incoming sublabel, and a binding relationship between the reverse outgoing interface and the reverse outgoing channel and the reverse outgoing sublabel.

The intermediate node sends the allocated reverse incoming sublabel to the downstream node through the Path message.

403: The last node receives the Path message sent by the upstream node, calculates a reverse outgoing interface and a positive incoming interface of the protection path of service S1 on the last node based on the routing information, and allocates a reverse outgoing channel and a positive incoming channel.

The last node allocates a sublabel in the reverse outgoing direction (a reverse outgoing sublabel for short) on the last node for the protection path of service S1 based on the sublabel carried in the Path message. A value of the allocated reverse outgoing sublabel and that of the sublabel carried in the received Path message (the reverse incoming sublabel of the upstream node) may be the same. In this way, a reverse binding relationship of service S1 on the last node is established, which includes: a binding relationship between the reverse outgoing interface and the reverse outgoing channel and the reverse outgoing sublabel. For the last node, the reverse incoming interface, the reverse incoming channel, and the reverse incoming sublabel may not exist.

The last node may further allocate a sublabel in the positive incoming direction (a positive incoming sublabel for short) on the last node for the protection path of service S1 based on the local allocation situation, and create a positive binding relationship of service S1 on the last node, which may include: a binding relationship between the positive incoming interface and the positive incoming channel and the positive incoming sublabel. For the last node, a positive outgoing interface, a positive outgoing channel, and a positive outgoing sublabel may not exist.

The last node may establish a sublabel mapping binding relationship based on the positive and reverse binding relationships, which may include the mapping binding relationship between the positive incoming interface and the positive incoming channel and the positive incoming sublabel, and the mapping binding relationship between the reverse outgoing interface and the reverse outgoing channel and the reverse outgoing sublabel.

The last node may record the established binding relationship in a form of a data table to facilitate subsequent query in a fast and accurate manner.

The last node sends the allocated positive incoming sublabel to the upstream node through the Resv message. The last node may also carry, in the Resv message, the indication information for creating the shared mesh protection path to indicate for the upstream node that the currently established LSP is the shared mesh protection path.

Further, each downstream node may carry, in the Resv message sent to the upstream node, the indication information for creating the shared mesh protection path to indicate for each upstream node that the currently established LSP is the shared mesh protection path. After receiving the Resv message, each upstream node specifies that the currently established LSP is the shared mesh protection path, and thereby initiates a corresponding process, which is not described here.

404: The intermediate node (if existing) receives the Resv message and calculates the positive outgoing interface and the positive incoming interface of the protection path of service S1 on the intermediate node based on the routing information, and allocates the positive outgoing channel and the positive incoming channel.

The intermediate node may allocate a sublabel in the positive outgoing direction (that is, a positive outgoing sublabel) on the intermediate node for the protection path of S1 based on the sublabel carried in the Resv message, where a value of the allocated positive outgoing sublabel and that of the sublabel (the positive incoming sublabel of the downstream node) carried in the Resv message may be the same; and allocate a sublabel in the positive incoming direction (that is, a positive incoming sublabel) on the intermediate node for the protection path of service S1 based on the local allocation situation.

In this case, the intermediate node may establish a positive binding relationship of service S1 on the intermediate node, including the binding relationship between the positive incoming interface and the positive incoming channel and the positive incoming sublabel, and a binding relationship between the positive outgoing interface and the positive outgoing channel and the positive outgoing sublabel.

The intermediate node may establish a sublabel mapping binding relationship of service S1 based on the previously established reverse binding relationship of service S1 on the intermediate node, which may include: the positive incoming interface, the positive incoming channel, the positive incoming sublabel, the positive outgoing interface, the positive outgoing channel, the positive outgoing sublabel, the reverse incoming interface, the reverse incoming channel, the reverse incoming sublabel, the reverse outgoing interface, the reverse outgoing channel, and the reverse outgoing sublabel.

The intermediate node may record the established binding relationship in the form of a data table to facilitate subsequent query in a fast and accurate manner.

The intermediate node sends the allocated positive incoming sublabel to the upstream node through the Resv message.

Further, the initial node receives the Resv message, calculates the positive outgoing interface of the protection path of service S1 on the initial node, and allocates the positive outgoing channel.

The initial node allocates a sublabel in the positive outgoing direction (that is, a positive outgoing sublabel) on the initial node for the protection path of service S1 based on the sublabel carried in the Resv message. A value of the allocated positive outgoing sublabel and that of the sublabel carried in the received Resv message (the positive incoming sublabel of the downstream node) may be the same. In this way, a positive binding relationship of service S1 on the initial node may be established, which may include: the binding relationship between the positive outgoing interface and the positive outgoing channel and the positive outgoing sublabel. For the initial node, the positive incoming interface, the positive incoming channel, and the positive incoming sublabel may not exist.

The initial node may establish a sublabel mapping relationship based on the positive and reverse binding relationships, including: a mapping binding relationship between the positive outgoing interface and the positive outgoing channel and the positive outgoing sublabel, and a mapping binding relationship between the reverse incoming interface and the reverse incoming channel and the reverse incoming sublabel.

The initial node may record the established binding relationship in the form of a data table to facilitate subsequent query in a fast and accurate manner.

Further, any node on the protection path may further carry, in the Path message sent to the downstream node, indication information about a sublabel suggested allocating, which is used to provide a suggestion for a sublabel allocated by the downstream node. The downstream node may allocate the positive incoming sublabel based on the suggestion of the upstream node to the greatest extent. For example, if the upstream node detects that the downstream node does not allocate the positive incoming sublabel based on the suggestion of the upstream node, the upstream node may accept the sublabel or reject the sublabel and further report an error based on a local policy.

Any node may further carry a sublabel set (which may include one or more sublabels) in the Path message sent to the downstream node, which is used to restrict a range of a sublabel allocated by the downstream node. The downstream node allocates the positive incoming sublabel based on the range provided by the upstream node. If the upstream node detects that the downstream node does not allocate the sublabel based on the range specified by the upstream node, the upstream node may reject the sublabel and further report an error based on the local policy.

Further, the initial node may carry, in the Path message sent to the downstream node, indication information about sublabels allocated by a part or all of the downstream nodes, which is used to specify the sublabels allocated by a part or all of the downstream nodes. The downstream node allocates the positive incoming sublabel based on the indication of the initial node. For example, if the initial node detects that the downstream node does not allocate the positive incoming sublabel based on the indication of the initial node, the initial node may reject the sublabel and further report an error based on the local policy.

Further, if information about a sublabel used by the LSP on each node needs to be collected, each node may, for example, add, into the Path message, a value of a sublabel allocated by the local node for an upstream direction and send the Path message to the downstream node; and add, into the Resv message, a value of a sublabel allocated by the local node for a downstream direction and send the Resv message to the upstream node. When the Path message is transmitted to the last node, the Path message carries information about sublabels that are used in the upstream direction by all nodes that the LSP passes through. When the Resv message is transmitted to the initial node, the Resv message carries information about sublabels that are used in the downstream direction by all nodes that the LSP passes through.

It may be understood that, in a bidirectional service, processing about such as allocating the reverse sublabel, creating the reverse binding relationship, and carrying the reverse sublabel in the foregoing process is required, whereas for a unidirectional service, the forgoing reverse processing processes may be skipped.

In an actual application, both a sublabel and indication information may be carried in a message object. The following first describes several types of objects that carry sublabels or indication information.

A Protection object may be expanded and a shared mesh protection flag may be added.

An indication bit is added in the Protection object to indicate that the established LSP is the shared mesh protection path. A format of the Protection object is as follows:

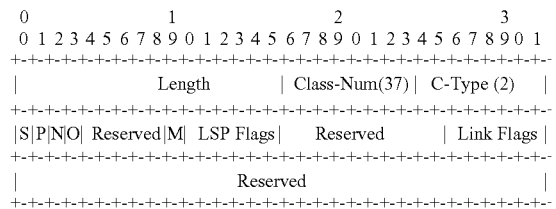

Indication meanings of each of the fields in the expanded Protection object may be as follows:

Length (16 bits): indicates the length of the object.

Class-num (8 bits): indicates a class number of the object. The value is 37.

C-Type (8 bits): indicates the type of the object. The value is 2.

S (1 bit): indicates that the LSP is a secondary LSP when the value is set to 1.

P (1 bit): indicates that the LSP is a protection LSP when the value is set to 1.

N (1 bit): indicates that a message exchange on a control plane is used for only advertisement at the time of protection switchover when the value is set to 1.

O (1 bit): indicates that a service is transmitted by the protection LSP after the protection switchover when the value is set to 1.

M (1 bit): indicates that the established LSP is a path used for shared mesh protection when the value is set to 1.

LSP Flags (6 bits): indicates a recovery type of the LSP.

Link Flags (6 bits): indicates a protection type of the link.

In the actual application, the M bit in the Protection object carried in the Path message for creating the protection path of the shared mesh protection service may be set to 1, so as to indicate for anode receiving the Path message that the currently established path is the protection path of the shared protection service.

Further, a new object Sublabel object may be defined.

This object is used to carry information about a sublabel in the downstream direction and is carried in the Resv message. A format of the Sublabel object is as follows:

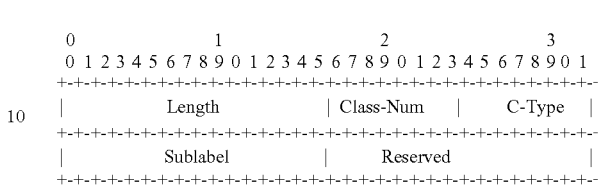

Indication meanings of each of the fields in the defined Sublabel object may be as follows:

Length (16 bits): indicates the length of the object.

Class-num (8 bits): indicates a class number of the object.

C-Type (8 bits): indicates a type of the object.

Sublabel (16 bits): indicates a value of the sublabel.

In the actual application, a node may, for example, use a value of an allocated sublabel of the LSP in the downstream direction (positive direction) as a value of the Sublabel field of the Sublabel object, carry the Sublabel object in the Resv message, and send the Resv message to the upstream node.

Further, a new object Suggested Sublabel object may be defined.

This object may be used to carry information about a suggested sublabel and may be carried through the Path message. A format of the Suggested Sublabel object may be as follows:

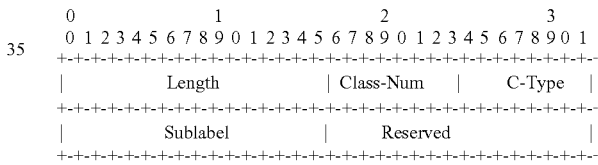

Indication meanings of each of the fields in the defined Suggested Sublabel object may be as follows:

Length (16 bits): indicates the length of the object.

Class-num (8 bits): indicates a class number of the object.

C-Type (8 bits): indicates a type of the object.

Sublabel (16 bits): indicates a value of the suggested sublabel.

In the actual application, if a suggestion needs to be given on a sublabel of the LSP in the downstream direction for the downstream node to allocate, the value of the suggested sublabel may be used as a value of the Sublabel field in the Suggested Sublabel object. In addition, the Suggested Sublabel object may be carried in the Path message and sent to the downstream node. After obtaining the Suggested Sublabel object, the downstream node may allocate the positive incoming sublabel based on the value of the suggested sublabel in the Suggested Sublabel object. For example, if the upstream node detects that the downstream node does not allocate the sublabel based on the value of the suggested sublabel in the Suggested Sublabel object, processing may be performed based on the local policy. For example, the sublabel allocated by the downstream node may be rejected or accepted.

Further, a new object Sublabel Set object may be defined.

This object is used to carry a specified allocation range of a sublabel and may be carried in the Path message. A format of the Sublabel Set object may be as follows:

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Length              |  Class-Num    |    C-Type     |
+-+-+-+-+-+-+-+-+-+-+-+-+-+-+-+-+-+-+-+-+-+-+-+-+-+-+-+-+-+-+-+-+
|    Action     |   Reserved    |        Sublabel Type          |
+-+-+-+-+-+-+-+-+-+-+-+-+-+-+-+-+-+-+-+-+-+-+-+-+-+-+-+-+-+-+-+-+
|           Sublabel 1          |             ...               |
+-+-+-+-+-+-+-+-+-+-+-+-+-+-+-+-+-+-+-+-+-+-+-+-+-+-+-+-+-+-+-+-+
:                               :                               :
:                               :                               :
+-+-+-+-+-+-+-+-+-+-+-+-+-+-+-+-+-+-+-+-+-+-+-+-+-+-+-+-+-+-+-+-+
|             ...               |           Sublabel N          |
+-+-+-+-+-+-+-+-+-+-+-+-+-+-+-+-+-+-+-+-+-+-+-+-+-+-+-+-+-+-+-+-+
```

Indication meanings of each of the fields in the defined Sublabel Set object may be as follows:

Length (16 bits): indicates the length of the object.

Class-num (8 bits): indicates a class number of the object.

C-Type (8 bits): indicates a type of the object.

Action (8 bits): For example, the value 0 may indicate an include list, which indicates that one or more sublabels in the sublabel set are included. The value 1 may indicate an exclude list, which indicates that one or more sublabels in the sublabel set are excluded. The value 2 may indicate an include range, which indicates a range of included sublabels. For example, there are two sublabels in the sublabel set, the first one indicates a start value of the sublabel range, and the second one indicates an end value. If a value of the second sublabel is 0, the sublabel range is not restricted. The value 3 may indicate an exclude range, which indicates a range of excluded sublabels. For example, there are two sublabels in the sublabel set, the first one indicates a start value of the sublabel range, and the second one indicates an end value. If a value of the second sublabel is 0, the sublabel range is not restricted.

Sublabel Type (14 bits): indicates a type of the sublabel.

Sublabel (16 bits): indicates a value of the sublabel.

In the actual application, if a range of sublabels allocated by the downstream node needs to be restricted in the downstream direction of the LSP, information about the specified sublabel range may be carried in each Sublabel field of the Sublabel Set object and sent to the downstream node through the Path message. The downstream node may allocate a proper sublabel based on the information about the sublabel range in the Sublabel Set object. For example, if the upstream node detects that a sublabel of the Sublabel object carried in the Resv message that is received from the downstream node is not in the range given by the Sublabel Set object, the sublabel is rejected and a failure indication may be returned.

Further, a new object Upstreamsublabel object may be defined.

This object is used to carry information about a sublabel in the upstream direction in a bidirectional LSP and may be carried in the Path message. A format of the Upstreamsublabel object may be as follows:

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Length              |  Class-Num    |    C-Type     |
+-+-+-+-+-+-+-+-+-+-+-+-+-+-+-+-+-+-+-+-+-+-+-+-+-+-+-+-+-+-+-+-+
|           Sublabel            |           Reserved            |
+-+-+-+-+-+-+-+-+-+-+-+-+-+-+-+-+-+-+-+-+-+-+-+-+-+-+-+-+-+-+-+-+
```

Indication meanings of each of the fields in the defined Upstreamsublabel object may be as follows:

Length (16 bits): indicates the length of the object.

Class-num (8 bits): indicates a class number of the object.

C-Type (8 bits): indicates a type of the object.

Sublabel (16 bits): indicates a value of the sublabel.

In the actual application, in the upstream direction of the bidirectional LSP, a value of a sublabel allocated by the upstream node is used as a value of the Sublabel field in the Upstreamsublabel object. The Upstreamsublabel object is carried in the Path message and sent to the downstream node.

Further, a new object Sublabel ERO subobject is defined.

This object is a sub-object of a Sublabel ERO object and is used to carry, in an ERO object, information about a sublabel so as to control a sublabel display. A format of the Sublabel ERO subobject may be as follows:

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|U|    Type     |    Length     |           Sublabel            |
+-+-+-+-+-+-+-+-+-+-+-+-+-+-+-+-+-+-+-+-+-+-+-+-+-+-+-+-+-+-+-+-+
```

Indication meanings of each of the fields in the defined Sublabel ERO subobject may be as follows:

U (1 bit): indicates a direction of the sublabel. If the value is 0, this field may indicate a downstream sublabel. If the value is 1, this field indicates an upstream sublabel. This field is used in the bidirectional LSP.

Type (7 bits): indicates a type of the object.

Length (8 bits): indicates the length of the object.

Sublabel (16 bits): indicates a value of the sublabel.

In actual application, if the initial node needs to specify sublabels allocated by a part or all of the downstream nodes on the protection path, that is, controlling the sub-label display (for example, a user specifies a sublabel), a value of the specified sublabel may be used as a value of the Sublabel field in the Sublabel ERO subobject. The Sublabel ERO subobject is carried in the ERO object of the Path message for controlling the sublabel display.

Further, a new object Sublabel RRO subobject is defined.

This object is a sub-object of a Sublabel RRO object and is used to carry, in an RRO object, information about a sublabel so as to collect sublabels used by the LSP. A format of the Sublabel RRO subobject may be as follows:

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|U|    Type     |    Length     |           Sublabel            |
+-+-+-+-+-+-+-+-+-+-+-+-+-+-+-+-+-+-+-+-+-+-+-+-+-+-+-+-+-+-+-+-+
```

Indication meanings of each of the fields in the defined Sublabel RRO subobject may be as follows:

U (1 bit): indicates a direction of the sublabel. If the value is 0, this field may indicate a downstream sublabel. If the value is 1, this field may indicate an upstream sublabel. This field is used in the bidirectional LSP.

Type (7 bits): indicates a type of the object.

Length (8 bits): indicates the length of the object.

Sublabel (16 bits): indicates a value of the sublabel.

In the actual application, if information about the sublabels used by the LSP on each node needs to be collected, each node may, for example, use a value of a sublabel allocated by the local node for the upstream direction as a value of the Sublabel field of the Sublabel RRO subobject, carry the Sublabel RRO subobject in the Path message, and send the Path message to the downstream node; and use a value of a sublabel allocated by the local node for the downstream direction as a value of the Sublabel field of the Sublabel RRO subobject, carry the Sublabel RRO subobject in the Resv message, and send the Resv message to the upstream node.

When the Path message is transmitted to the last node, the RRO object carried in the Path message carries information about sublabels used in the upstream direction by all nodes that the LSP passes through. When the Resv message is transmitted to the initial node, the RRO object carried in the Resv message carries information about sublabels used in the downstream direction by all nodes that the LSP passes through.

Through the preceding process, a sublabel may be allocated and a mapping relationship may be established for the protection path of service S1. After the sublabel is allocated and the sublabel mapping relationship is established, when the working path of service S1 is faulty, the initial node (or the last node) of the service monitors the fault, switches service S1 over to the protection path, queries and finds a corresponding sublabel mapping relationship, sets related information in the APS overhead, and transmits the recovery information through the APS overhead. When receiving the recovery information borne by the APS overhead, each node queries and finds a corresponding sublabel mapping relationship based on the specified feature of the recovery information, establishes a corresponding connection, continues to transmit the recovery information to another node through the APS overhead and establish a connection on the protection path till the last node (or the initial node). The last node (or the initial node) queries and finds the corresponding sublabel mapping relationship based on the recovery information carried in the APS overhead and may switch service S1 over to the protection path. In this way, service S1 is transmitted through the protection path so that service S1 is recovered quickly.

Further, to better understand the technical solution of this embodiment of the present invention, two more specific application scenarios are used for detailed description.

Scenario 1:

In this scenario, a 4-byte APS overhead may be divided to 8 parts, that is, 8 sub-APS overheads in total (as shown in FIG. 4-b). Each sub-APS overhead has 4 bits and each sub-APS may define a maximum of 16 messages related to the shared mesh protection.

Each sub-APS overhead is responsible for transmitting a service-related message. An APS overhead of a channel may transmit a maximum of 8 messages related to the shared mesh protection service. That is, the channel is shared by a maximum of 8 protection paths of the shared mesh protection service.

In this scenario, a sublabel may correspond to the sub-APS overhead. Allocating the sublabel is equivalent to allocating the sub-APS overhead. The sublabel carries the number of the sub-APS overhead. A flag of the shared mesh protection path may be carried in the Protection object of the Path message for creating the shared mesh protection path, which indicates that what created by the Path message is the shared mesh protection path. Referring to FIG. 4-c, the following takes a process of creating a shared mesh protection path of service 2 as an example.

An initial node N1 calculates a reverse incoming interface of a protection path of service 2 on the initial node N1 by using the routing information and allocates a reverse incoming channel. Node N1 allocates a sub-APS overhead for the reverse incoming direction of the protection path of service 2 and allocates a reverse incoming sublabel of the protection path of service 2 on node N1. For example, if a 2# Sub-APS overhead of a CH2 channel is allocated for service 2, the reverse incoming sublabel of the protection path of service 2 on node N1 indicates the 2# Sub-APS overhead (that is, indicating that a downstream node N6 uses the 2# Sub-APS overhead of the CH2 channel to transmit recovery information of service 2). Node N1 may establish a reverse binding relationship, which may include a binding relationship between the reverse incoming interface and the reverse incoming channel and the reverse incoming sublabel.

Node N1 may, for example, use the number 2 of the 2# Sub-APS overhead as the value of the Sublabel field in the Upstreamsublabel object and sends the Upstreamsublabel object to node N6 through the Path message. In this manner, information about the sub-APS overhead allocated by node N1 for service 2 is notified to node N6.

Further, both node N1 and node N6 may carry the flag of the shared mesh protection path in the Protection object of the Path message sent to a downstream node to indicate for each downstream node that the currently established LSP is the shared mesh protection path. After receiving the Path message, each downstream node (node N6 and node N5) specifies that the currently established LSP is the shared mesh protection path based on the flag of the shared mesh protection path carried in the Protection object of the Path message, and thereby initiates a corresponding process, which is not described here.

Further, if node N1 needs to give a suggestion on a sub-APS overhead allocated by node N6, node N1 may, for example, use a value of a sub-label using to indicate the number of the sub-APS overhead that node N1 suggests allocating as the value of the Sublabel field in the Suggested Sublabel object. Information about the sub-APS overhead that node N1 suggests allocating may be carried by carrying the Suggested Sublabel object in the Path message.

Further, if node N1 needs to restrict a range of a sub-APS overhead allocated by the downstream node, node N1 may use a value of a sublabel indicating restriction on the range of the allocated sub-APS overhead as the value of the Sublabel field in the Sublabel Set object. Information about the restriction range of the sub-APS overhead may be carried by carrying the Sublabel Set object in the Path message.

Further, if the initial node N1 needs to specify sub-APS overheads allocated by a part or all of the nodes on the protection path, node N1 may, for example, use a value of a sublabel using to indicate the number of a sub-APS overhead that node N1 designates allocating as the value of the Sublabel field in the Sublabel ERO sub-object. The Sublabel ERO sub-object is carried in the ERO object of the Path message.

Node N6 receives the Path message, calculates a reverse incoming interface and a reverse outgoing interface of the protection path of service 2 on node N6, allocates a reverse incoming channel and a reverse outgoing channel, and allocates the 2# Sub-APS overhead of the CH2 channel to service 2 based on the value of the sublabel in the Upstreamsublabel object carried in the Path message. A reverse outgoing sublabel allocated by node N6 indicates the 2# Sub-APS overhead.

Node N6 further allocates a sub-APS overhead in the reverse incoming direction on node N6 for service 2 and allocates a reverse incoming sublabel based on a local allocation situation. For example, if a 1# Sub-APS overhead of a CH8 channel is allocated for service 2, the reverse incoming sublabel of the protection path of service 2 on node N6 indicates the 1# Sub-APS overhead (that is, indicating that the downstream node N5 use the 1# Sub-APS overhead of the CH8 channel to transmit the recovery information of service 2). In this case, node N6 may establish a reverse binding relationship of service 2 on node N6, which may include: a binding relationship between the reverse incoming interface and the reverse incoming channel and the reverse incoming sublabel, and a binding relationship between the reverse outgoing interface and the reverse outgoing channel and the reverse outgoing sublabel.

Node N6 may, for example, use the number 1 of the 1# Sub-APS overhead as the value of the Sublabel field in the Upstreamsublabel object and sends the Upstreamsublabel object to node N5 through the Path message. In this manner, information about the sub-APS overhead allocated by node N6 for service 2 is notified to node N5.

The last node N5 receives the Path message, calculates a reverse outgoing interface and a positive incoming interface of the protection path of service 2 on node N5 based on the routing information, allocates a reverse outgoing channel and a positive incoming channel, and allocates the 1# Sub-APS overhead of the CH8 channel to service 2 based on information in the Upstreamsublabel object carried in the Path message. A reverse outgoing sublabel allocated by node N5 indicates the 1# Sub-APS overhead. In this case, node N5 may establish a reverse binding relationship of the protection path of service 2 on node N5, which may include: the binding relationship between the reverse outgoing interface and the reverse outgoing channel and the reverse outgoing sublabel.

Node N5 further allocates a sub-APS overhead in the positive incoming direction on node N5 for service 2 and allocates a positive incoming sublabel based on the local allocation situation. For example, if the 1# Sub-APS overhead of the CH8 channel is allocated for service 2, the positive incoming sublabel of the protection path of service 2 on node N5 indicates the 1# Sub-APS overhead (that is, indicating that the upstream node N6 uses the 1# Sub-APS overhead of the CH8 channel to transmit the recovery information of service 2). In this case, node N5 may establish a positive binding relationship of service 2 on node N5, including a binding relationship between the positive incoming interface and the positive incoming channel and the positive incoming sublabel.

Node N5 may establish a sublabel mapping relationship based on the positive and reverse binding relationships, which may include: the mapping binding relationship between the positive incoming interface and the positive incoming channel and the positive incoming sublabel, and the mapping binding relationship between the reverse outgoing interface and the reverse outgoing channel and the reverse outgoing sublabel.

Node N5 may record the established binding relationship in the form of a data table to facilitate subsequent query in a fast and accurate manner.

Node N5 may, for example, use the number 1 of the 1# Sub-APS overhead as the value of the Sublabel field in the Sublabel object and sends the Sublabel object to node N6 through the Resv message. In this manner, information about the sub-APS overhead allocated by node N5 for service 2 is notified to node N6.

Further, both node N5 and node N6 may carry the flag of the shared mesh protection path in the Protection object of the Resv message sent to an upstream node to indicate for each upstream node that the currently established LSP is the shared mesh protection path. After receiving the Resv message, each upstream node (node N6 and node N1) specifies that the currently established LSP is the shared mesh protection path based on the flag of the shared mesh protection path carried in the Protection object of the Resv message, and thereby initiates a corresponding process, which is not described here.

Node N6 receives the Resv message, calculates a positive incoming interface and a positive outgoing interface of the protection path of service 2 on node N6, allocates a positive incoming channel and a positive outgoing channel, and allocates the 1# Sub-APS overhead of the CH8 channel to service 2 based on information in the Sublabel field of the Sublabel object carried in the Resv message. The positive outgoing sublabel allocated by node N6 indicates the 1# Sub-APS overhead.

Node N6 further allocates a sub-APS overhead in the positive incoming direction on node N6 for service 2 and allocates a positive incoming sublabel based on the local allocation situation. For example, if the 2# Sub-APS overhead of the CH2 channel is allocated for service 2, the positive incoming sublabel of the protection path of service 2 on node N6 indicates the 2# Sub—APS overhead (that is, indicating that the upstream node N1 uses the 2# Sub-APS overhead of the CH2 channel to transmit the recovery information of service 2). In this case, node N6 may establish a positive binding relationship of service 2 on node N6, which may include: the binding relationship between the positive incoming interface and the positive incoming channel and the positive incoming sublabel, and a binding relationship between the positive outgoing interface and the positive outgoing channel and the positive outgoing sublabel.

Node N6 may establish a sublabel mapping relationship based on the reverse binding relationship that has been established when the Path message is received, which may include: the mapping binding relationship between the positive incoming interface and the positive incoming channel and the positive incoming sublabel, the mapping binding relationship between the positive outgoing interface and the positive outgoing channel and the positive outgoing sublabel, the mapping binding relationship between the reverse incoming interface and the reverse incoming channel and the reverse incoming sublabel, and the mapping binding relationship between the reverse outgoing interface and the reverse outgoing channel and the reverse outgoing sublabel.

The intermediate node N6 may record the established binding relationship in the form of a data table to facilitate subsequent query in a fast and accurate manner.

Node N6 may, for example, use the number 2 of the 2# Sub-APS overhead as the value of the Sublabel field in the Sublabel object and sends the Sublabel object to node N1 through the Resv message. In this manner, information about the sub-APS overhead allocated by node N6 for service 2 is notified to node N1.

The initial node N1 receives the Resv message, calculates a positive outgoing interface of the protection path of service 2 on node N1, allocates a positive outgoing channel, and allocates the 2# Sub-APS overhead of the CH2 channel to service 2 based on information in Sublabel field of the Sublabel object carried in the Resv message. The positive outgoing sublabel allocated by node N1 indicates the 2# sub-APS overhead.

In this case, node N1 may establish a positive binding relationship of service 2 on node N1, including the binding relationship between the positive outgoing interface and the positive outgoing channel and the positive outgoing sublabel.

Node N1 may establish a sublabel mapping relationship based on the positive and reverse binding relationships, which may include: the mapping binding relationship between the positive outgoing interface and the positive outgoing channel and the positive outgoing sublabel, and the mapping binding relationship between the reverse incoming interface and the reverse incoming channel and the reverse incoming sublabel.

Node N1 may record the established binding relationship in the form of a data table to facilitate subsequent query in a fast and accurate manner.

In this case, each node on the protection path of service 2 allocates a sub-APS overhead for service 2. Each node uses the sub-APS overhead allocated for service 2 to bear and transmit the recovery information of service 2.

Further, if node N1 needs to perform display specifying or display controlling on the sub-APS overhead used by service 2, information about the specified sub-APS overhead may be carried in the Sublabel ERO sub-object and sent to each downstream node through the Path message. After receiving the Path message, each node allocates a corresponding sub-APS overhead based on information about the Sublabel ERO sub-object in the ERO carried in the Path message and uses the corresponding sublabel for indication.

Further, if information about the sub-APS overhead used by service 2 on each node needs to be collected, information about a sub-APS overhead allocated for a reverse direction may be carried in the Sublabel RRO sub-object, added to the RRO object, and sent to the downstream node through the Path message; information about a sub-APS overhead allocated for a positive direction is put into the Sublabel RRO sub-object, added to the RRO object, and sent to the upstream node through the Resv message. It may be understood that when the Path message is transmitted to last node N5, the RRO object carried in the Path message has information about the sub-APS overheads used by service 2 in the reverse direction on all nodes on the protection path of service 2. When the Resv message is transmitted to the initial node N1, the RRO object has information about the sub-APS overheads used by service 2 in the positive direction on all the nodes on the protection path of service 2.

When a working path of service 2 is faulty, the initial node N1 (or the last node N5) of service 2 may monitor the fault, switch service 2 over to the protection path, query and find the sublabel mapping relationship of service 2, change the status of the corresponding sub-APS overhead to Recovered, and send the recovery information to another node through the APS overhead. When receiving the recovery information borne over the APS overhead, each node queries and finds a corresponding sublabel mapping relationship based on the specified feature of the recovery information, establish a corresponding connection, continues to transmit the recovery information to another node through the APS overhead and establish a connection on the protection path till the last node N5 (or the initial node N1). The last node N5 (or the initial node N1) queries and finds the corresponding sublabel mapping relationship based on the recovery information carried in the APS overhead and may switch service 2 over to the protection path. In this way, service 2 is transmitted through the protection path so that service 2 is recovered quickly. A configuration process of a protection path of another service may be deduced by analogy based on the preceding manner.

Scenario 2:

This scenario is applicable to a scenario in which the entire APS overhead is shared by all services protected by the shared mesh. That is, the APS overhead is not divided; instead, all the services protected by the share mesh share the APS overhead on a shared channel. When the working path is faulty, a service distinction device (the service distinction device is used to identify and distinguish a service and the service may be determined through the service distinction device) of the service that needs to be switched over is carried in the recovery information (the recovery information may, for example, include only information about the service distinction device) and is transmitted through the APS overhead of the shared channel. Each node on the protection path may establish a corresponding connection to switch over the corresponding service based on the service distinction device carried in the APS overhead.

In this scenario, a sublabel corresponds to the service distinction device. Allocating the sublabel is equivalent to allocating the service distinction device. The sublabel may carry the service distinction device. The flag of the shared mesh protection path may be carried in the Protection object of the Path message for creating the shared mesh protection path, which indicates what created by the Path message is the shared mesh protection path. Referring to FIG. 4-*d*, the following takes the process of creating the shared mesh protection path of service 2 as an example.

Specifically, node N1 calculates a reverse incoming interface of the protection path of service 2 on node N1, allocates a reverse incoming channel based on the routing information, allocates a service distinction device for the reverse incoming direction of service 2, and allocates a reverse incoming sublabel. For example, if service distinction device 2 is allocated for service 2, the reverse incoming sublabel of the protection path of service 2 on node N1 indicates service distinction device 2 (that is, indicating that the recovery information of service 2 transmitted by a downstream node N6 includes service distinction device 2). Node N1 may establish a reverse binding relationship, which may include: a binding relationship between the reverse incoming interface and the reverse incoming channel and the reverse incoming sublabel.

Node N1 may use the number 2 of service distinction device 2 as the value of the Sublabel field in the Upstreamsublabel object and sends the Upstreamsublabel object to node N6 through the Path message. In this manner, information about the service distinction device allocated by node N1 for service 2 is notified to node N6.

Further, both node N1 and node N6 may carry the flag of the shared mesh protection path in the Protection object of the Path message sent to a downstream node to indicate for each downstream node that the currently established LSP is the shared mesh protection path. After receiving the Path message, each downstream node (node N6 and node N5) specifies that the currently established LSP is the shared mesh protection path based on the flag of the shared mesh protection path carried in the Protection object of the Path message, and thereby initiates a corresponding process, which is not described here.

Further, if node N1 needs to give a suggestion on a service distinction device allocated by node N6, N1 may, for example, use a value of a sublabel using to indicate the service distinction device that node N1 suggests allocating as the value of the Sublabel field in the Suggested Sublabel object. Information about the service distinction device that node N1 suggests allocating may be carried by carrying the Suggested Sublabel object in the Path message.

Further, if node N1 needs to restrict a range of a service distinction device allocated by the downstream node, node N1 may use a value of a sublabel indicating restriction on the range of the allocated service distinction device as the value of the Sublabel field in the Sublabel Set object. Information about the restriction range of the service distinction device may be carried by carrying the Sublabel Set object in the Path message.

Further, if the initial node N1 needs to specify service distinction devices allocated by a part or all of the nodes on the protection path, node N1 may, for example, use a value of a sublabel using to indicate the service distinction device that node N1 designates allocating as the value of the Sublabel field in the Sublabel ERO sub-object. The Sublabel ERO sub-object is carried in the ERO object of the Path message.

Node N6 receives the Path message, calculates a reverse incoming interface and a reverse outgoing interface of the protection path of service 2 on node N6, allocates a reverse incoming channel and a reverse outgoing channel, and allocates service distinction device 2 to service 2 based on the value of the Sublabel in the Upstreamsublabel object carried in the Path message. A reverse outgoing sublabel allocated by node N6 indicates service distinction device 2.

Node N6 further allocates a service distinction device in the reverse incoming direction on node N6 for service 2 and allocates a reverse incoming sublabel based on a local allocation situation. For example, if service distinction device 1 is allocated for service 2, the reverse incoming sublabel of the protection path of service 2 on node N6 indicates service distinction device 1 (that is, indicating that the recovery information of service 2 transmitted by a downstream node N5 includes service distinction device 1). In this case, node N6 may establish a reverse binding relationship of service 2 on node N6, which may include: the binding relationship between the reverse incoming interface and the reverse incoming channel and the reverse incoming sublabel, and a binding relationship between the reverse outgoing interface and the reverse outgoing channel and the reverse outgoing sublabel.

Node N6 may, for example, use the number 1 of service distinction device 1 as the value of the Sublabel field in the Upstreamsublabel object and sends the Upstreamsublabel object to node N5 through the Path message. In this manner, information about the service distinction device allocated by node N6 for service 2 is notified to N5.

The last node N5 receives the Path message, calculates a reverse outgoing interface and a positive incoming interface of the protection path of service 2 on node N5 based on the routing information, allocates a reverse outgoing channel and a positive incoming channel, and allocates service distinction device 1 to service 2 based on information in the Upstreamsublabel object carried in the Path message. A reverse outgoing sublabel allocated by node N5 indicates service distinction device 1. In this case, node N5 may establish a reverse binding relationship of the protection path of service 2 on node N5, which may include: the binding relationship between the reverse outgoing interface and the reverse outgoing channel and the reverse outgoing sublabel.

Node N5 further allocates a service distinction device in the positive incoming direction on node N5 for service 2 and allocates a positive incoming sublabel based on the local allocation situation. For example, if service distinction device 1 is allocated for service 2, the positive incoming sublabel of the protection path of service 2 on node N5 indicates service distinction device 1 (that is, indicating that the recovery information of service 2 transmitted by the upstream node N6 includes service distinction device 1). In this case, node N5 may establish a positive binding relationship of service 2 on node N5, including a binding relationship between the positive incoming interface and the positive incoming channel and the positive incoming sublabel.

Node N5 may establish a sublabel mapping relationship based on the positive and reverse binding relationships, which may include: the mapping binding relationship between the positive incoming interface and the positive incoming channel and the positive incoming sublabel, and the mapping binding relationship between the reverse outgoing interface and the reverse outgoing channel and the reverse outgoing sublabel.

Node N5 may record the established binding relationship in the form of a data table to facilitate subsequent query in a fast and accurate manner.

Node N5 may, for example, use the number 1 of service distinction device 1 as the value of the Sublabel field in the Sublabel object and sends the Sublabel object to node N6 through the Resv message. In this manner, information about the service distinction device allocated by node N5 for service 2 is notified to node N6.

Further, both node N5 and node N6 may carry the flag of the shared mesh protection path in the Protection object of the Resv message sent to an upstream node to indicate for each upstream node that the currently established LSP is the shared mesh protection path. After receiving the Resv message, each upstream node (node N6 and node N1) specifies that the currently established LSP is the shared mesh protection path based on the flag of the shared mesh protection path carried in the Protection object of the Resv message, and thereby initiates a corresponding process, which is not described here.

Node N6 receives the Resv message, calculates a positive incoming interface and a positive outgoing interface of the protection path of service 2 on node N6, allocates a positive incoming channel and a positive outgoing channel, and allocates service distinction device 1 to service 2 based on information in the Sublabel field of the Sublabel object carried in the Resv message. The positive outgoing sublabel allocated by node N6 indicates service distinction device 1.

Node N6 further allocates a service distinction device in the positive incoming direction on node N6 for service 2 and allocates a positive incoming sublabel based on the local allocation situation. For example, if service distinction device 2 is allocated for service 2, the positive incoming sublabel of the protection path of service 2 on node N6 indicates service distinction device 2 (that is, indicating that the recovery information of service 2 transmitted by the upstream node N1 includes service distinction device 2).

In this case, N6 may establish a positive binding relationship of service 2 on node N6, which may include: the binding relationship between the positive incoming interface and the positive incoming channel and the positive incoming sublabel, and a binding relationship between the positive outgoing interface and the positive outgoing channel and the positive outgoing sublabel.

Node N6 may establish a sublabel mapping relationship based on the reverse binding relationship that has been established when the Path message is received, which may include: the mapping binding relationship between the positive incoming interface and the positive incoming channel and the positive incoming sublabel, the mapping binding relationship between the positive outgoing interface and the positive outgoing channel and the positive outgoing sublabel, the mapping binding relationship between the reverse incoming interface and the reverse incoming channel and the reverse incoming sublabel, and the mapping binding relationship between the reverse outgoing interface and the reverse outgoing channel and the reverse outgoing sublabel.

The intermediate node N6 may record the established binding relationship in the form of a data table to facilitate subsequent query in a fast and accurate manner.

Node N6 may, for example, use the number 2 of service distinction device 2 as the value of the Sublabel field in the Sublabel object and sends the Sublabel object to node N1 through the Resv message. In this manner, information about the service distinction device allocated by node N6 for service 2 is notified to node N1.

The initial node N1 receives the Resv message, calculates a positive outgoing interface of the protection path of service 2 on node N1, allocates a positive outgoing channel, and allocates service distinction device 2 to service 2 based on information in the Sublabel object carried in the Resv message. The positive outgoing sublabel allocated by node N1 indicates service distinction device 2. In this case, node N1 may establish a positive binding relationship of service 2 on node N1, including the binding relationship between the positive outgoing interface and the positive outgoing channel and the positive outgoing sublabel.

Node N1 may establish a sublabel mapping relationship based on the positive and reverse binding relationships, which may include: the mapping binding relationship between the positive outgoing interface and the positive outgoing channel and the positive outgoing sublabel, and the mapping binding relationship between the reverse incoming interface and the reverse incoming channel and the reverse incoming sublabel.

Node N1 may record the established binding relationship in the form of a data table to facilitate subsequent query in a fast and accurate manner.

In this case, each node on the protection path of service 2 allocates a service distinction device for service 2. The recovery information of service 2 transmitted by each node carries the allocated service distinction device.

Further, if display specifying or display controlling needs to be performed on the service distinction device used by service 2, information about the specified service distinction device may be carried in the Sublabel ERO sub-object and sent to each downstream node through the Path message. After receiving the Path message, each node allocates a corresponding service distinction device based on information about the Sublabel ERO sub-object in the ERO carried in the Path message and uses the corresponding sublabel for indication.

Further, if information about the service distinction device used by service 2 on each node needs to be collected, information about a service distinction device allocated for a reverse direction may be carried in the Sublabel RRO sub-object, added to the RRO object, and sent to the downstream node through the Path message; information about a service distinction device allocated for a positive direction is put into the Sublabel RRO sub-object, added to the RRO object, and sent to the upstream node through the Resv message. It may be understood that when the Path message is transmitted to the last node N5, the RRO object carried in the Path message has information about the service distinction devices used by service 2 in the reverse direction on all nodes on the protection path of service 2. When the Resv message is transmitted to the initial node N1, the RRO object has information about the service distinction devices used by service 2 in the positive direction on all the nodes on the protection path of service 2.

When a working path of service 2 is faulty, the initial node N1 (or the last node N5) of service 2 may monitor the fault, switch service 2 over to the protection path. query and find the sublabel mapping relationship of service 2, change the status of the corresponding APS overhead to Recovered, and send the recovery information that carries information about the distinction device of service 2 to another node through the APS overhead. When receiving the recovery information borne over the APS overhead, each node queries and finds a corresponding sublabel mapping relationship based on the information about the distinction device of service 2 carried in the recovery information, establish a corresponding connection, continues to transmit the recovery information to another node through the APS overhead and establish a connection on the protection path till the last node N5 (or the initial node N1). The last node N5 (or the initial node N1) queries and finds the corresponding sublabel mapping relationship based on the recovery information borne in the APS overhead and may switch service 2 over to the protection path. In this way, service 2 is transmitted through the protection path so that service 2 is recovered quickly. A configuration process of a protection path of another service may be deduced by analogy based on the preceding manner.

As can be seen from above, in this embodiment, a node on a protection path allocates and transmits a sublabel that is used to indicate a specified feature of recover information of a service so that an upstream node or a downstream node of this node transmits the recovery information of the service according to the sublabel. In this way, each node on the protection path may be capable of directly determining a service to be recovered when receiving the recovery information of the service. In addition, a configuration operation is simple. In this way, reliable support may be provided for subsequently performing automatic and quick protection switchover of the service.

Further, a range of an allocated sublabel is specified or suggested for another node and sublabels allocated by each node on the protection path are collected, which facilitates implementation of good maintenance and management.

To better implement the technical solutions of the present invention, an embodiment of the present invention further provides an optical network node.

Embodiment 4

Figure 5:
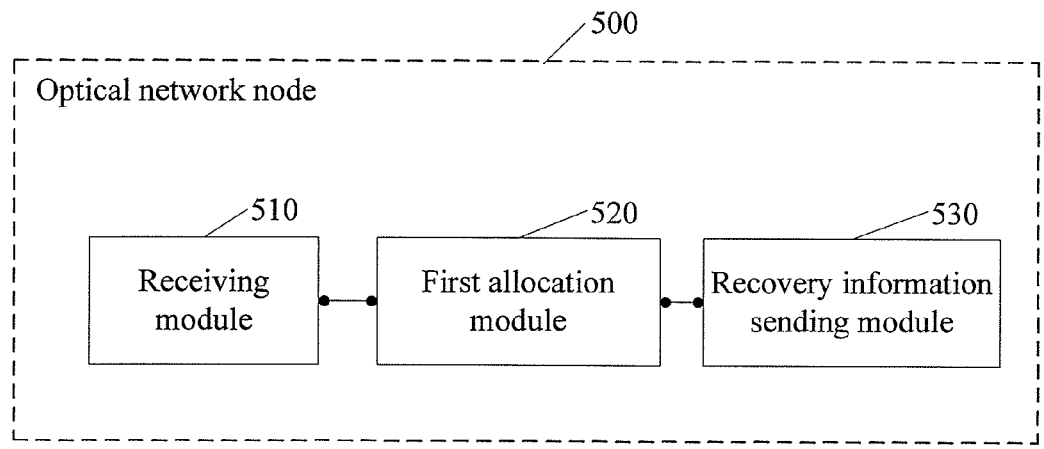
FIG. 5 is a schematic diagram of an optical network node according to Embodiment 4 of the present invention.

Referring to FIG. 5, an optical network node 500 according to Embodiment 4 of the present invention may specifically include: a receiving module 510, a first allocation module 520, and a recovery information sending module 530.

The receiving module 510 is configured to receive a Resv message sent by a second node, where Resv message carries a second positive incoming sublabel allocated by the second node for a protection path of a first service and the second positive incoming sublabel is used to indicate a specified feature of recovery information of the first service.

The specified feature of the recovery information of the first service may include for example: a specified identifier (for example, a service distinction device) included in the recovery information of the first service, a specified data structure of the recovery information of the first service, an identifier of a sub-APS overhead (for example, the number of the sub-overhead) that bears the recovery information of the first service, and other related features.

The first allocation module 520 is configured to allocate a first positive outgoing sublabel for the protection path of the first service based on the second positive incoming sublabel, where the first positive outgoing sublabel corresponds to the second positive incoming sublabel.

In an application scenario, the second positive incoming sublabel allocated by the second node for the protection path of the first service may be any information that is capable of indicating the specified feature of the recovery information of the first service. For example, the sublabel may indicate one or more of the following specified features of the recovery information of the first service: the specified identifier included in the recovery information of the first service, the specified data structure of the recovery information of the first service, the number of the sub-APS overhead that bears the recovery information of the first service, and other specified features.

The recovery information sending module 530 is configured to transmit the recovery information of the first service to the second node based on an indication of the first positive outgoing sublabel when knowing that a working path of the first service is faulty.

It may be understood that the second node may be the last node of the protection path of the first service or an intermediate node of the protection path of the first service, and the optical network node 500 is an upstream node of the second node.

In an application scenario, the second node may carry the allocated second positive incoming sublabel in a message of a second type and send the second positive incoming sublabel to the upstream node on the protection path of the first service by using this signaling message. In this way, the optical network node 500 of the second positive incoming sublabel is obtained and a first positive outgoing sublabel is correspondingly allocated (where, a value of the second positive incoming sublabel and that of the first positive outgoing sublabel may be identical or have a corresponding derived relationship; definitely, the first positive outgoing sublabel correspondingly allocated by the optical network node 500 is also used to indicate the specified feature of the recovery information of the first service; in addition, the specified feature of the recovery information of the first service indicated by the first positive outgoing sublabel and that indicated by the second positive incoming sublabel are the same).

Further, when knowing that the working path of the first service is faulty, the optical network node 500 may transmit the recovery information of the first service to the second node based the indication of the first positive outgoing sublabel. When receiving the recovery information of the first service transmitted by the optical network node 500, the second node may directly determine that a service to be recovered is the first service based on the second positive incoming sublabel allocated by the second node. In this way, the first service may be quickly and automatically switched over onto the protection path of the first service for transmission.

In an application scenario, the optical network node 500 may further includes:

a route calculation module, configured to calculate a positive outgoing interface of the protection path of the first service on the optical network node 500 based on routing information and allocates a positive outgoing channel for the protection path of the first service;

a binding relationship establishment module, configured to establish a positive binding relationship of the protection path of the first service on the optical network node 500, where the positive binding relationship includes the positive outgoing interface, the positive outgoing channel, and a mapping binding relationship with the first positive outgoing sublabel; and a protection switchover module, configured to switch the first service over to the protection path of the first service based on the positive binding relationship established by the binding relationship establishment module when knowing that the work path of the first service is faulty.

In an application scenario, if the first service is a bidirectional service, the route calculation module may further be configured to calculate a reverse incoming interface of the protection path of the first service on the optical network node based on the routing information and allocate a reverse incoming channel for the protection path of the first service.

The optical network node 500 may further includes:

a second allocation module, configured to allocate a first reverse incoming sublabel for the protection path of the first service, where the first reverse incoming sublabel is used to indicate the specified feature of the recovery information of the first service; and a first message sending module, configured to send the first reverse incoming sublabel to the second node on the protection path of the first service through a message of a first type, where the message of the first type also carries indication information for creating the protection path of the first service.

The binding relationship establishment module is further configured to establish a reverse binding relationship of the protection path of the first service on the optical network node 500, where the reverse binding relationship may include a mapping binding relationship between the reverse incoming interface and the reverse incoming channel and the first reverse incoming sublabel.

If the optical network node 500 is an intermediate node of the first service, the route calculation module may further be configured to calculate a positive incoming interface of the protection path of the first service on the optical network node 500 based on the routing information and allocate a positive incoming channel for the protection path of the first service.

The optical network node 500 may further include:

a third allocation module, configured to allocate a first positive incoming sublabel for the protection path of the first service, where the first positive incoming sublabel is used to indicate the specified feature of the recovery information of the first service, and the positive binding relationship established by the binding relationship establishment module may further include: a mapping binding relationship between the positive incoming interface and the positive incoming channel and the first positive incoming sublabel; and a second message sending module, configured to send the first positive incoming sublabel to a third node on the protection path of the first service through the message of the second type.

In an application scenario, each downstream node may add the positive incoming sublabel allocated for the first service to the message of the second type. In this case, the optical network node 500 may further include:

a sublabel collection module, configured to collect and record the positive incoming sublabels that are allocated by each downstream node for the protection path of the first service and carried in the message of the second type.

It should be noted that the optical network node 500 in this embodiment may be node N1 or N6 in the preceding method embodiments and may be used to implement all the technical solutions in the preceding method embodiments. A function of each function module of the optical network node 500 may be specifically implemented based on the methods in the preceding method embodiments. For detailed implementation processes, see the related description in the preceding embodiments. No further description is provided herein.

To better implement the technical solutions of the embodiments of the present invention, an embodiment of the present invention further provides an optical network node.

Embodiment 5

Figure 6:
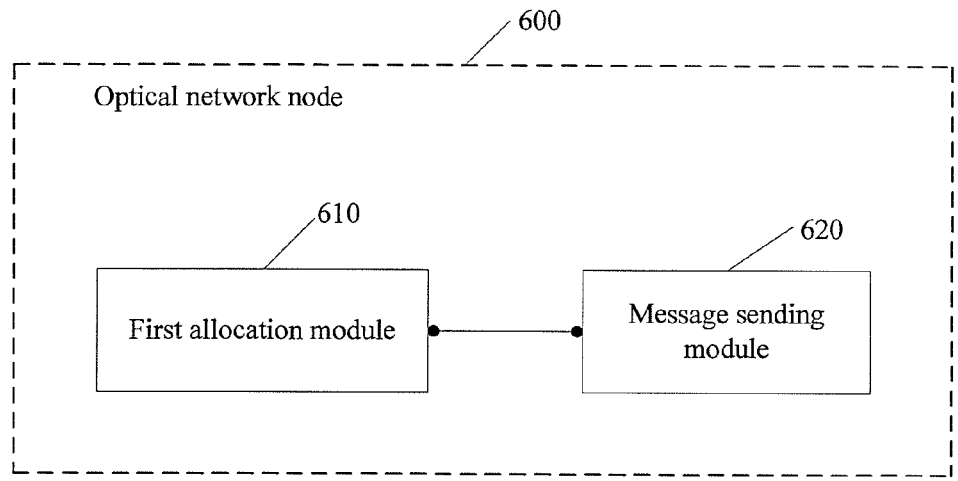
FIG. 6 is a schematic diagram of an optical network node according to Embodiment 5 of the present invention.

Referring to FIG. 6, an optical network node 600 according to Embodiment 5 of the present invention may specifically include: a first allocation module 610 and a message sending module 620.

The first allocation module 610 is configured to allocate a second positive incoming sublabel for a protection path of a first service, where the second positive incoming sublabel is used to indicate a specified feature of recovery information of the first service.

The specified feature of the recovery information of the first service may include for example: a specified identifier (for example, a service distinction device) included in the recovery information of the first service, a specified data structure of the recovery information of the first service, an identifier of a sub-APS overhead (for example, the number of the sub-overhead) that bears the recovery information of the first service, and other related features.

The message sending module 620 is configured to send the second positive incoming sublabel to a first node on the protection path of the first service through a message of a second type.

It may be understood that the first node may be an initial node of the protection path of the first service or an intermediate node of the protection path of the first service, and the optical network node 600 is a downstream node of the first node.

In an application scenario, the first allocation module 610 may be specifically configured to allocate the second positive incoming sublabel for the protection path of the first service, where the second positive incoming sublabel is used to indicate the sub-APS overhead that bears the recovery information of the first service or the service distinction device carried in the recovery information of the first service.

In an application scenario, the optical network node 600 may carry the allocated second positive incoming sublabel in the message of the second type and send the second positive incoming sublabel to an upstream node on the protection path of the first service by using this signaling message. In this way, the first node of the second positive incoming sublabel is obtained and a first positive outgoing sublabel is correspondingly allocated (where, a value of the second positive incoming sublabel and that of the first positive outgoing sublabel may be identical or have a corresponding derived relationship; definitely, the first positive outgoing sublabel correspondingly allocated by the first node is also used to indicate the specified feature of the recovery information of the first service; in addition, the specified feature of the recovery information of the first service indicated by the first positive outgoing sublabel and that indicated by the second positive incoming sublabel are the same).

Further, when knowing that a working path of the first service is faulty, the first node may transmit the recovery information of the first service to the optical network node 600 based on an indication of the first positive outgoing sublabel. When receiving the recovery information of the first service transmitted by the first node, the optical network node 600 may directly determine that a service to be recovered is the first service based on the second positive incoming sublabel allocated by the optical network node 600. In this way, the first service may be quickly and automatically switched over onto the protection path of the first service for transmission.

If the first service is a bidirectional service, the optical network node 600 may further include:

a receiving module, configured to receive a message of a first type sent by the first node, where the message of the first type carries a first reverse incoming sublabel allocated by the first node for the protection path of the first service, the first reverse incoming sub-node is used to indicate the specified feature of the recovery information of the first service, and the message of the first type also carries indication information for creating the protection path of the first service;

a second allocation module, configured to allocate a second reverse outgoing sublabel for the protection path of the first service based on the first reverse incoming sublabel, where the second reverse outgoing sublabel corresponds to the first reverse incoming sublabel; and a recovery information sending module, configured to transmit the recovery information of the first service to the first node based on an indication of the second reverse outgoing sublabel when knowing that the working path of the first service is faulty.

In an application scenario, the optical network node 600 may further include:

a route calculation module, configure to calculate a reverse outgoing interface and a reverse outgoing channel of the protection path of the first service on the optical network node 600 based on routing information;

a reverse binding relationship establishment module, configure to establish a reverse binding relationship of the protection path of the first service on the optical network node 600, where the reverse binding relationship includes a mapping binding relationship between the reverse outgoing interface and the reverse outgoing channel and the second reverse outgoing sublabel; and a first protection switchover module, configure to switch the first service over to the protection path of the first service based on the reverse binding relationship established by the reverse binding relationship establishment module when knowing that the working path of the first service is faulty.

In an application scenario, the route calculation module may further be configured to calculate a positive incoming interface of the protection path of the first service on the second node based on the routing information and allocates a positive incoming channel for the protection path of the first service.

The optical network node 600 may further include:

a positive binding relationship establishment module, configure to establish a positive binding relationship of the protection path of the first service on the second node, where the positive binding relationship includes a mapping binding relationship between the positive incoming interface and positive incoming channel of the protection path of the first service on the second node and the second positive incoming sublabel; and a second protection switchover module, configure to switches the first service over to the protection path of the first service based on the positive binding relationship established by the positive binding relationship establishment module when knowing that the working path of the first service is faulty.

In an application scenario, if the message of the first type further carries indication information about a sublabel that the first node suggests allocating, the first allocation module 610 may specifically be configured to allocate the second positive incoming sublabel for the protection path of the first service based on the suggestion of the first node or based on a local allocation situation.

In another application scenario, if the message of the first type further carries indication information about a range of a sublabel that the first node designates allocating, the first allocation module 610 is specifically configured to allocate the second positive incoming sublabel for the protection path of the first service within the range of the sublabel that the first node designates allocating.

In another application scenario, if the message of the first type further carries indication information about a sublabel that the initial node designates allocating, the first allocation module 610 may specifically be configured to allocate the second positive incoming sublabel for the protection path of the first service based on an indication of the indication information about the sublabel that the initial node designates allocating.

In an application scenario, each upstream node may add the reverse incoming sublabel allocated for the first service to the message of the first type. In this case, the optical network node 600 may further include:

a sublabel collection module, configured to collect and record the reverse incoming sublabels that are allocated by each upstream node for the protection path of the first service and carried in the message of the first type.

It should be noted that optical network node 600 in this embodiment may be node N5 or N6 in the preceding method embodiments and may be used to implement all the technical solutions in the preceding method embodiments. A function of each function module of the optical network node 600 may be specifically implemented based on the methods in the preceding method embodiments. For detailed implementation processes, see the related description in the preceding embodiments. No further description is provided herein.

To better implement the technical solutions of the embodiments of the present invention, an embodiment of the present invention further provides an optical network system.

Embodiment 6

Figure 7:
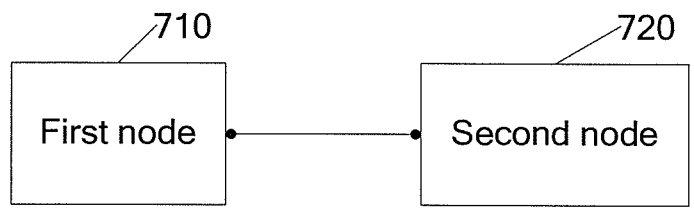
FIG. 7 is a schematic diagram of an optical network system according to Embodiment 6 of the present invention.

Referring to FIG. 7, an optical network system according to Embodiment 6 of the present invention may include: a first node 710 and a second node 720.

The second node 720 is configured to allocate a second positive incoming sublabel for a protection path of a first service, where the second positive incoming sublabel is used to indicate a specified feature of recovery information of the first service; and send the second positive incoming sublabel to the first node 710 on the protection path of the first service through a message of a second type.

The first node 710 is configured to receive the message of the second type sent by the second node 720, where the message of the second type carries the second positive incoming sublabel allocated by the second node 720 for the protection path of the first service; allocate a first positive outgoing sublabel for the protection path of the first service based on the second positive incoming sublabel, where the first positive outgoing sublabel corresponds to the second positive incoming sublabel; and transmit the recovery information of the first service to the second node 720 based on an indication of the first positive outgoing sublabel when a working path of the first service is faulty.

Further, if the first service is a bidirectional service, the first node 710 may further configured to allocate a first reverse incoming sublabel for the protection path of the first service, where the first reverse incoming sublabel is used to indicate the specified feature of the recovery information of the first service; and send the first reverse incoming sublabel to the second node 720 on the protection path of the first service through a message of a first type.

The second node 720 may receive the message of the first type sent by the first node 710, where the message of the first type may carry the first reverse incoming sublabel allocated by the first node 710 for the protection path of the first service; allocate a second reverse outgoing sublabel for the protection path of the first service based on the first reverse incoming sublabel, where the second reverse outgoing sublabel corresponds to the first reverse incoming sublabel; and transmit the recovery information of the first service to the first node 710 based on an indication of the second reverse outgoing sublabel when knowing that the working path of the first service is faulty.

It should be noted that in this embodiment, the first node 710 may be node N1 or N6 in the preceding method embodiments, the second node 720 may be node N5 or N6 in the preceding method embodiments, and the two nodes may be used to implement all the technical solutions in the preceding method embodiments. A function of each function module of the first node 710 and the second node 720 may be specifically implemented based on the methods in the preceding method embodiments. For detailed implementation processes, see the related description in the preceding embodiments. No further description is provided herein.

It should be noted that the preceding method embodiments are described as a series of action combinations to simplify the description. Those skilled in the art should understand that the present invention is not restricted by the action sequence. According to the present invention, some steps can be implemented in another sequence or simultaneously. In addition, those skilled in the art should also understand that the embodiments described in the specification are exemplary embodiments and the related actions and modules are not definitely mandatory in the present invention.

In the preceding embodiments, different emphases are posed on the description about each embodiment. For a part that is not described in detail in an embodiment, see the related description in another embodiment.

To sum up, in the embodiments of the present invention, a node on a protection path allocates and transmits a sublabel that is used to indicate a specified feature of the recover information of a service so that an upstream node or a downstream node of this node transmits the recovery information of the service according to the sublabel. In this way, each node on the protection path may be capable of directly determining a service to be recovered when receiving the recovery information of the service. In addition, a configuration operation is simple. In this way, reliable support may be provided for subsequently performing automatic and quick protection switchover of the service.

Further, a range of an allocated sublabel is specified or suggested for another node and sublabels allocated by each node on the protection path are collected, which facilitates implementation of good maintenance and management.

Persons of ordinary skill in the art should understand that all or part of the steps in the methods of the preceding embodiments may be implemented by a program instructing relevant hardware. The program may be stored in a computer readable storage medium. The storage medium may include a Read Only Memory (ROM, Read-Only Memory), a Random Access Memory (RAM, Random Access Memory), a magnetic disk, a Compact Disc-Read Only Memory (CD-ROM), and so on.

The preceding describes the method and device for implementing the shared mesh protection and the optical network system that are provided in the embodiments of the present invention in detail. In this document, specific examples are used to illustrate principles and implementation manners of the present invention. The descriptions in the preceding embodiments are only used to help understanding of the methods and core ideas of the present invention. In addition, persons skilled in the art can make modifications on the specific implementation manners and the application scope based on the idea of the present invention. To sum up, content of the present invention shall not be construed as a limitation on the present invention.

What is claimed is:

1. A method for implementing shared mesh protection, the method comprising:
   receiving, by a first node, a message of a second type sent by a second node, wherein the message of the second type carries a second positive incoming sublabel allocated by the second node for a protection path of a first service and the second positive incoming sublabel is used to indicate a specified feature of recovery information of the first service;
   allocating a first positive outgoing sublabel for the protection path of the first service based on the second positive incoming sublabel, wherein the first positive outgoing sublabel corresponds to the second positive incoming sublabel;
   calculating a positive outgoing interface of the protection path of the first service on the first node based on routing information and allocating a positive outgoing channel for the protection path of the first service;
   establishing a positive binding relationship of the protection path of the first service on the first node, wherein the positive binding relationship comprises a mapping binding relationship between the positive outgoing interface and the positive outgoing channel and the first positive outgoing sublabel;
   transmitting the recovery information of the first service to the second node based on an indication of the first positive outgoing sublabel when knowing that a working path of the first service is faulty; and
   switching the first service over to the protection path of the first service based on the established positive binding relationship when knowing that the working path of the first service is faulty.

2. The method according to claim 1, wherein:
   the second positive incoming sublabel is used to indicate a sub-APS overhead that bears the recovery information of the first service or a service distinction device carried in the recovery information of the first service.

3. The method according to claim 1, further comprising:
   calculating a reverse incoming interface of the protection path of the first service on the first node based on routing information and allocating a reverse incoming channel for the protection path of the first service;
   allocating a first reverse incoming sublabel for the protection path of the first service, wherein the first reverse incoming sublabel is used to indicate the specified feature of the recovery information of the first service; and
   sending the first reverse incoming sublabel to the second node on the protection path of the first service through a message of a first type, wherein the message of the first type further carries indication information for creating the protection path of the first service.

4. The method according to claim 1, further comprising:
   calculating a positive incoming interface of the protection path of the first service on the first node based on the routing information and allocating a positive incoming channel for the protection path of the first service;
   allocating a first positive incoming sublabel for the protection path of the first service, wherein the first positive incoming sublabel is used to indicate the specified feature of the recovery information of the first service and the positive binding relationship further comprises: a mapping binding relationship between the positive incoming interface and the positive incoming channel and the first positive incoming sublabel; and
   sending the first positive incoming sublabel to a third node on the protection path of the first service through the message of the second type.

5. A method for implementing shared mesh protection, the method comprising:
   receiving a message of a first type sent by a first node, wherein the message of the first type carries a first reverse incoming sublabel allocated by the first node for a protection path of a first service, a first reverse incoming sub-node is used to indicate the specified feature of recovery information of the first service, and the message of the first type further carries indication information for creating the protection path of the first service;
   allocating a second reverse outgoing sublabel for the protection path of the first service based on the first reverse incoming sublabel; wherein the second reverse outgoing sublabel corresponds to the first reverse incoming sublabel;
   calculating a reverse outgoing interface and a reverse outgoing channel of the protection path of the first service on a second node based on routing information;
   establishing a reverse binding relationship of the protection path of the first service on the second node, wherein the reverse binding relationship comprises a mapping binding relationship between the reverse outgoing interface and the reverse outgoing channel and the second reverse outgoing sublabel;
   transmitting the recovery information of the first service to the first node based on an indication of the second reverse outgoing sublabel when knowing that a working path of the first service is faulty;
   switching the first service over to the protection path of the first service based on the established reverse binding relationship when knowing that the working path of the first service is faulty;
   allocating, by the second node, a second positive incoming sublabel for a protection path of a first service, wherein the second positive incoming sublabel is used to indicate a specified feature of recovery information of the first service; and
   sending the second positive incoming sublabel to the first node on the protection path of the first service through a message of a second type.

6. The method according to claim 5, wherein:
   the allocating the second positive incoming sublabel for the protection path of the first service, wherein the second positive incoming sublabel is used to indicate the specified feature of the recovery information of the first service comprises:
   allocating the second positive incoming sublabel for the protection path of the first service, wherein the second positive incoming sublabel is used to indicate a sub-APS overhead that bears the recovery information of the first service or a service distinction device carried in the recovery information of the first service.

7. The method according to claim 5, wherein:
   if the message of the first type further carries indication information about a sublabel that the first node suggests allocating, the allocating the second positive incoming sublabel for the protection path of the first service comprises:
   allocating the second positive incoming sublabel for the protection path of the first service based on the suggestion of the first node or a local allocation situation;
   or,
   if the message of the first type further carries indication information about a range of a sublabel that the first node designates allocating, the allocating the second positive incoming sublabel for the protection path of the first service comprises:

allocating the second positive incoming sublabel for the protection path of the first service within the range of the sublabel that the first node designates allocating;

or, if the message of the first type further carries indication information about a sublabel that an initial node designates allocating, the allocating the second positive incoming sublabel for the protection path of the first service comprises:

allocating the second positive incoming sublabel for the protection path of the first service based on an indication of the indication information about the sublabel that the initial node designates allocating.

8. An optical network node, comprising:

a receiving module, configured to receive a message of a second type sent by a second node, wherein the message of the second type carries a second positive incoming sublabel allocated by the second node for a protection path of a first service and the second positive incoming sublabel is used to indicate a specified feature of recovery information of the first service;

a first allocation module, configured to allocate a first positive outgoing sublabel for the protection path of the first service based on the second positive incoming sublabel, wherein the first positive outgoing sublabel corresponds to the second positive incoming sublabel;

a route calculation module, configured to calculate a positive outgoing interface of the protection path of the first service on the optical network node based on routing information and allocate a positive outgoing channel for the protection path of the first service;

a binding relationship establishment module, configured to establish a positive binding relationship of the protection path of the first service on the optical network node, wherein the positive binding relationship comprises a mapping binding relationship between the positive outgoing interface and positive outgoing channel of the protection path of the first service on the optical network node and the first positive outgoing sublabel;

a recovery information sending module, configured to transmit the recovery information of the first service to the second node based on an indication of the first positive outgoing sublabel when knowing that a working path of the first service is faulty; and a protection switchover module, configured to switch the first service over to the protection path of the first service based on the established positive binding relationship when knowing that the working path of the first service is faulty.

9. The optical network node according to claim 8, wherein:

the route calculation module is further configured to calculate a reverse incoming interface of the protection path of the first service on the optical network node based on routing information and allocates a reverse incoming channel for the protection path of the first service; and the optical network node further comprises:

a second allocation module, configured to allocate a first reverse incoming sublabel for the protection path of the first service, wherein the first reverse incoming sublabel is used to indicate the specified feature of the recovery information of the first service; and a first message sending module, configured to send the first reverse incoming sublabel to the second node on the protection path of the first service through a message of a first type, wherein the message of the first type further carries indication information for creating the protection path of the first service.

10. An optical network node, comprising:

a receiving module, configured to receive a message of a first type sent by a first node, wherein the message of the first type carries a first reverse incoming sublabel allocated b the first node for a protection path of a first service, a first reverse incoming sub-node is used to indicate a specified feature of recovery information of the first service, and the message of the first type further carries indication information for creating the protection path for the first service;

a second allocation module, configured to allocate a second reverse outgoing sublabel for the protection path of the first service based on the first reverse incoming sublabel, wherein the second reverse outgoing sublabel corresponds to the first reverse incoming sublabel;

a route calculation module, configured to calculate a reverse outgoing interface and a reverse outgoing channel of the protection path of the first service on the optical network node based on routing information;

a reverse binding relationship establishment module, configured to establish a reverse binding relationship of the protection path of the first service on the optical network node, wherein the reverse binding relationship comprises a mapping binding relationship between the reverse outgoing interface and reverse outgoing channel of the protection path of the first service on the optical network node and the second reverse outgoing sublabel;

a recovery information sending module, configured to transmit the recovery information of the first service to the first node based on an indication of the second reverse outgoing sublabel when knowing that a working path of the first service is faulty;

a first protection switchover module, configured to switch the first service over to the protection path of the first service based on the established reverse binding relationship when knowing that the working path of the first service is faulty;

a first allocation module, configured to allocate a second positive incoming sublabel for a protection path of a first service, wherein the second positive incoming sublabel is used to indicate a specified feature of recovery information of the first service; and a message sending module, configured to send the second positive incoming sublabel to the first node on the protection path of the first service through a message of a second type.

* * * * *